United States Patent [19]

Nakawaki et al.

[11] Patent Number: 4,930,373
[45] Date of Patent: Jun. 5, 1990

[54] BRAKE SYSTEM FOR AUTOMATIC TRANSMISSION

[75] Inventors: Yasunori Nakawaki, Susono; Fumihiro Ushijima, Okazaki; Akio Numazawa, Nagoya; Toshiyuki Asada, Susono, all of Japan

[73] Assignee: Toyota Jidosha Kabushiki Kaisha, Japan

[21] Appl. No.: 258,770

[22] Filed: Oct. 17, 1988

[30] Foreign Application Priority Data

| Dec. 4, 1987 | [JP] | Japan | 62-306951 |
| Dec. 11, 1987 | [JP] | Japan | 62-313565 |
| Dec. 11, 1987 | [JP] | Japan | 62-313566 |
| Mar. 23, 1988 | [JP] | Japan | 63-69125 |
| Apr. 21, 1988 | [JP] | Japan | 63-99182 |

[51] Int. Cl.$^5$ ............... F16H 3/44; F16D 51/00; F01B 7/20; F01B 7/00
[52] U.S. Cl. ............... 475/128; 188/77 R; 92/52; 92/62; 475/146; 475/148; 475/285
[58] Field of Search ............... 74/782, 781 R; 188/77 R, 77 W; 92/52, 51, 62, 63

[56] References Cited

U.S. PATENT DOCUMENTS

| 2,513,192 | 6/1950 | McFarland | 188/77 R X |
| 2,901,888 | 9/1959 | Swift | 188/77 R X |
| 2,966,888 | 1/1961 | Jania et al. | 92/52 |
| 3,353,637 | 11/1967 | Chana | 188/77 R X |
| 3,540,558 | 11/1970 | Lamburn | 74/781 R X |
| 4,388,986 | 6/1983 | Umezawa | 188/77 R |
| 4,601,233 | 7/1986 | Sugano | 92/52 |
| 4,773,300 | 9/1988 | Klatt et al. | 92/62 X |

FOREIGN PATENT DOCUMENTS

| 48-9294 | 3/1973 | Japan . |
| 53-72964 | 6/1978 | Japan . |
| 55-139545 | 10/1980 | Japan . |
| 61-124742 | 8/1986 | Japan . |
| 1077764 | 8/1967 | United Kingdom | 188/77 R |

Primary Examiner—Allan D. Herrmann
Assistant Examiner—Chris Campbell
Attorney, Agent, or Firm—Oliff & Berridge

[57] ABSTRACT

Herein disclosed is a brake system for use with an automatic transmission for braking a rotatable member such as a brake drum, which is accommodated in a casing and connected to the sun gear or the like of a planetary gear mechanism, by bringing a brake band having two ends into contact with the outer circumference with the rotatable member. The brake system comprises: a cylinder tube so held in a predetermined position in the casing as to move forward and backward in the tangential direction of the rotatable member; a piston fitted in the cylinder tube; a piston rod united with the piston and projecting from the cylinder tube such that it is connected to one end of the brake band; an anchor rod so held in a predetermined position in the casing as to move forward and backward in the tangential direction of the rotatable member and conneced to the other end of the brake band; a connecting member for connecting the cylinder tube and the anchor rod so tha they may move together forward and backward; and a valve mechanism disposed in the cylinder tube and adapted to be opened, when the cylinder tube is moved by a force received in a predetermined direction from the brake band through the piston rod to either apply a fluid pressure in a direction to reduce the fastening force by the brake band or release the fluid pressure.

29 Claims, 16 Drawing Sheets

BRAKE SYSTEM FOR AUTOMATIC TRANSMISSION

BACKGROUND OF THE INVENTION

The present invention relates to a brake system for use in an automatic transmission and, more particularly, to a band brake.

An automatic transmission for automobiles employs two or three sets of planetary gear mechanisms or differential gear mechanisms, as is well known in the prior art, for establishing a suitable gear ratio by fixing one of the three elements of each gear mechanism (e.g., a sun gear, a carrier and a ring gear in the case of the planetary gear mechanism, or a ring gear and a pair of meshing side gears in the case of the differential gear mechanism) while using the other two elements as input and output members. One example of this structure is schematically shown in FIG. 16, in which an automatic transmission is intended to establish speed changes of three-forward and one-reverse gear ratios by using two sets of planetary gear mechanisms 1 and 2.

An input shaft 3 to be connected to an engine (although not shown) is united with the pump impeller 5 of a torque converter 4. The pump impeller 5 is faced across a stator 6 by a turbine runner 7, which is connected to the input shaft 8 of the automatic transmission. This input shaft 8 is connected to the ring gear 9 of the rear planetary gear mechanism 2 through a first clutch C1 and an intermediate shaft 10 and to a sun gear shaft 11 through a second clutch C2. The sun gear shaft 11 carries the sun gears 12 and 13 of the planetary gear mechanisms 1 and 2, respectively. Between the sun gear shaft 11 and a stationary portion such as the transmission casing, there are serially arranged a first one-way clutch Oc1 and a first brake B1 so as to block the revolutions of the sun gear shaft 11 in one predetermined direction. In order to block the revolutions of the sun gear shaft 11 selectively, moreover, there is arranged a second brake B2 acting as a band brake, which is disposed around the outer circumference of such a clutch drum of the second clutch C2 as is united with the sun gear shaft 11. A ring gear 14 of the front planetary gear mechanism 1 and a carrier 15 of the rear planetary gear mechanism 2 are connected to each other and to an output shaft 16. The front planetary gear mechanism 1 has its carrier 17 connected to both a second one-way clutch Oc2 for blocking its revolutions in one predetermined direction and a third brake B3 acting as a band brake for selectively blocking its forward and backward revolutions.

The speed changes to be set by the automatic transmission described above are enumerated in Table 1, in which: circles indicate the state of "in engagement"; blanks indicate the state of "out of engagement"; and parenthesized circles indicate the state of "in engagement" while the automobile is being braked by the engine.

TABLE 1

| | Clutches | | Brakes | | | One-Way Clutches | |
|---|---|---|---|---|---|---|---|
| | C1 | C2 | B1 | B2 | B3 | Oc1 | Oc2 |
| 1st Gear | O | | | | (O) | O | |
| 2nd Gear | O | | O | (O) | | O | |
| 3rd Gear | O | O | | | | | |
| Reverse | | O | | | O | | |

In the forward first gear ratio, as seen from Table 1, the first clutch C1 is engaged to connect the ring gear 9 of the rear planetary gear mechanism 2 to the input shaft 8. In this case, a torque in the reverse direction (which is opposite to the revolving direction of the input shaft 8) is applied to the carrier 17 of the front planetary gear mechanism 1 but is blocked by the second one-way clutch Oc2 to cause the carrier 17 to act as the stationary element so that the gear ratio takes a high value. If, however, the braking force is to be effected in that state by the engine by throttling the accelerator opening while the vehicle is running downhill, for example, the carrier 17 is allowed to freely revolve by a forward torque coming from the output shaft 16 so that the ring gear 9 of the rear planetary gear mechanism 2 acts as the stationary element to render the braking force by the engine ineffective. Therefore, the braking effect by the engine is recovered by engaging the third brake B3 to use the carrier 17 as the stationary element and by using the ring gear 9 of the rear planetary gear mechanism 2 as the output element.

In the case of the forward second gear ratio, on the other hand, the first clutch C1 is engaged to connect the ring gear 9 of the rear planetary gear mechanism 2 to the input shaft 8, and the first brake B1 is engaged to block the reverse revolutions of the sun gear shaft 11. As a result, the carrier 15 of the rear planetary gear mechanism 2 is revolved in the forward direction together with the revolutions of the pinion gear meshing therewith so that the gear ratio takes a value lower than the forward first one. If, in this case, the input comes from the output shaft 16, the forward torque is applied to the sun gear shaft 11 so that the sun gear shaft 11 is revolved in the forward direction at an accelerated speed while causing the ring gear 9 of the rear planetary gear mechanism 2 to act as the stationary element. While the automobile is being braked by the engine, therefore, the second brake B2 is engaged to block the forward and backward revolutions of the sun gear shaft 11.

In the case of the forward third gear ratio, still moreover, the first and second clutches C1 and C2 are engaged. In this case, the rear planetary gear mechanism 2 is united as a whole so that the gear ratio takes the value "1".

In the reverse case, on the other hand, the second clutch C2 is engaged to connect the sun gear shaft 11 to the input shaft 9, and the third brake B3 is engaged to fix the carrier 17 of the front planetary gear mechanism 1. As a result, the revolutions of the sun gear 12 of the front planetary gear mechanism 1 are reversed and transmitted to the ring gear 14 to establish a reverse state decelerated in accordance with the ratio of those gears.

Incidentally in the aforementioned automatic transmission, as is apparently seen from Table 1, the second brake B2 is engaged only when the automobile is braked by the engine. This engagement comes from the provision of the first one-way clutch Oc1. It is, therefore, conceivable that the first one-way clutch Oc1 is substituted by the second brake B2 to omit the first one-way clutch Oc1 and the first brake B1. This concept is exemplified in FIG. 17, and its operations are tabulated in Table 2 but are identical to those of the automatic transmission shown in FIG. 16 except the fact that the second brake B2 never fails to be engaged in the case of the forward second gear ratio.

TABLE 2

|  | Clutches | | Brakes | | One-Way Clutches |
| --- | --- | --- | --- | --- | --- |
|  | C1 | C2 | B2 | B3 | Oc2 |
| 1st Gear | O | | | (O) | O |
| 2nd Gear | O | | O | | |
| 3rd Gear | O | O | | | |
| Reverse | | O | | O | |

Generally speaking, the automatic transmission has a major technical target to change its speeds as smoothly as possible. For this target, it is sufficient to increase the number of speed changes and accordingly the number of planetary gear mechanisms required. This requirement raises another problem that the automatic transmission will increase its weight and size. As shown in FIGS. 16 and 17, therefore, the one-way clutches Oc1 and Oc2 are used to effect automatic disengagement for the speed changes thereby to prevent the resultant shocks. Since, however, the one-way clutches effect the engagements only in one direction, as named so, they cannot function in case the torque is reversed as in case the automobile is to be braked by the engine. Hence, the structure shown in FIG. 16 requires the second brake B2, which raises one cause for increasing the weight and price.

On the contrary, the structure shown in FIG. 17 can drop the weight and cost because it omits the first one-way clutch Oc1 and the first brake B1 from the structure shown in FIG. 16. Since, however, the second brake B2 is released for the speed change from the forward second to third speed, as tabulated in Table 2, the releasing timing is difficult to set, thus causing another problem that the structure and adjustment of the hydraulic circuit inclusive are complicated.

In the automatic transmission using a band brake such as the aforementioned second brake B2 and third brake B3, there has been proposed in Japanese Utility Model Laid-Open No. 61-124742 a brake having a built-in shock absorber for lightening the shocks which are caused by engaging that band brake. In the structure of this proposal, a support stem for holding one end of the brake band and a cylinder tube of a hydraulic servo-cylinder for generating a fastening force are arranged to move back and forth in the tangential direction of the revolving member and are connected and united together, and an elastic member is interposed between the support stem and the stationary portion such as a casing. With this structure, therefore, the support stem and the cylinder tube are moved together by the revolving force of the revolving member, when the braking force is applied by actuating the hydraulic cylinder to fasten the brake band, but the elastic member can exert a shock absorbing action upon the movements to avoid an abrupt braking motion and absorb the speed changing shocks. However, this shock absorbing action is caused only when the brake is to be engaged but cannot absorb the shocks of the speed change accompanied by the release of the brake.

SUMMARY OF THE INVENTION

The present invention has an object to provide a brake system for an automatic transmission, which can have the so-called "one-way characteristics" to block the revolutions of a revolving member such as a brake drum in one predetermined direction and to release the braking force automatically in case the revolving member revolves in the opposite direction.

In order to achieve this object, the brake system for an automatic transmission according to the present invention is constructed such that a hydraulic cylinder for pushing one end of a brake band arranged around the outer circumference of the revolving member and an anchor rod connected to the other end of the brake band are arranged to move together back and forth in the tangential direction of the revolving member, and such that there is provided a valve mechanism for applying and releasing a fluid pressure to and from the hydraulic cylinder, when this cylinder moves back or forth, to reduce the fastening force of the brake band.

Another object of the present invention is to provide a brake system for an automatic transmission, which can apply and release the braking force upon the revolving member with a simple structure.

In order to achieve this object, the brake system for an automatic transmission according to the present invention comprises: a first chamber for establishing a fastening force for pushing a piston in the hydraulic cylinder; a second chamber for pushing the hydraulic cylinder; a passage formed to provide communication between the first and second chambers and adapted to be opened or closed by a valve mechanism; a fluid pressure supply passage adapted to be supplied with a fluid pressure, when a predetermined speed is to be set, and having communication with the first chamber; and a change-over valve for providing selective communication of the second chamber with the fluid pressure supply passage and a discharge passage.

A further object of the present invention is to provide a brake system for an automatic transmission, which is enabled to apply a braking force from the automobile to the engine without deteriorating the speed changing shocks.

In order to achieve this object, the brake system for an automatic transmission according to the present invention is constructed such that the change-over valve is switched by the hydraulic pressure to provide communication of the second chamber with the hydraulic pressure supply passage at the instant when the speed change for braking the revolving member is substantially completed.

DETAILED DESCRIPTION OF THE PREFERRED EMBODIMENTS

Figure 1:
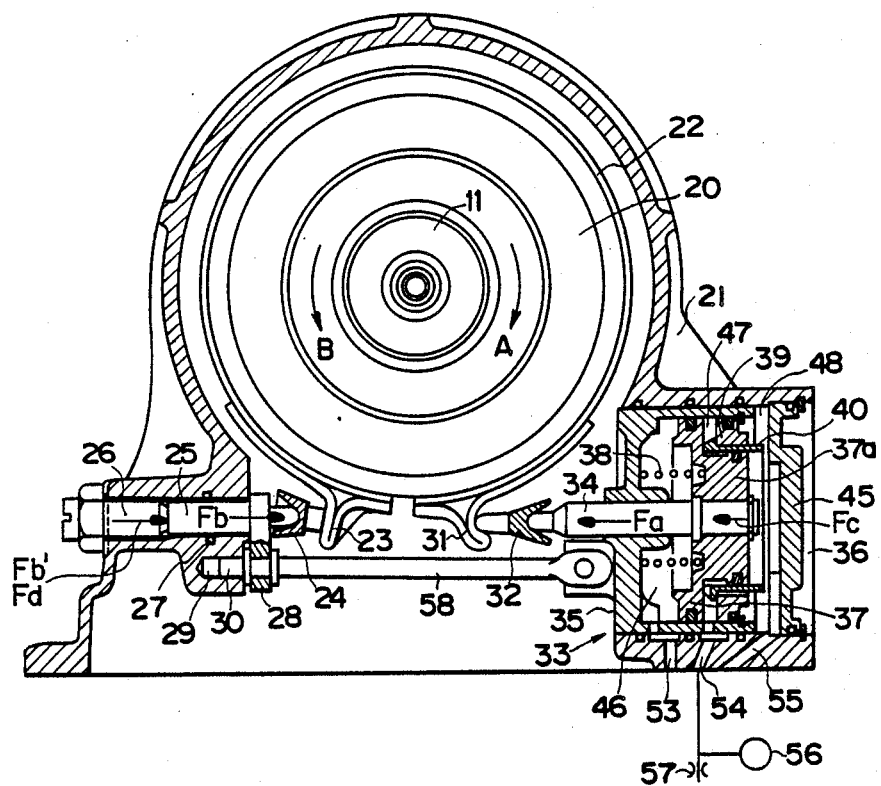
FIG. 1 is a section showing one embodiment of the present invention.

FIG. 1 is a section taken from the input shaft (not shown) and showing an embodiment in which the present invention is applied to the aforementioned second brake B2. A brake drum 20 or the revolving member also acts as the clutch hub of the second clutch C2 and is accommodated in a transmission casing 21 such that it is connected to the sun gear shaft 11. The brake drum 20 has its outer circumference surrounded by a brake band 22 which has an outer circumference slightly shorter than that of the brake drum 20. The brake band 22 has its two ends arranged to face each other with a small clearance. One end or the first anchor 23 of the brake band 22 is anchored by pushing the leading end of an anchor rod 25 to a cap 24 having a spherical or arcuate receiving surface. The anchor rod 25 is so fitted in a hole formed in the transmission casing 21 in the tangential direction of the brake drum 20 that it is allowed to move back and forth in the tangential direction of the brake drum 20. The anchor rod 25 has one of its moving end (i.e., the leftward moving end, as shown in FIG. 1) regulated by an adjust bolt 26 and its outer circumference sealed up by an O-ring 27. Moreover, the anchor rod 25 has its leading end formed with a radially extending flange 28, which carries a guide pin 30 fitted in a hole 29 formed in the transmission casing 21.

Against the other end, i.e., a second anchor 31 of the brake band 22, like the aforementioned first anchor 23, there abuts a cap 32 having a spherical or arcuate surface. The second anchor 31 is held by pushing a piston rod 34 of a hydraulic servo-cylinder 33, which is disposed in the transmission casing 21 and in a position to face the aforementioned anchor rod 25 substantially, to that cap 32.

The hydraulic servo-cylinder 33 is constructed such that its tube 35 is fitted to move back and forth in a chamber 36 which is formed in the transmission casing 21. The cylinder tube 35 is a bottomed cylinder having an integral end plate, through which is extended the piston rod 34. A piston 37 carrying the rear end of the piston rod 34 is fitted to move back and forth in the cylinder tube 35. In front of the piston 37, there is arranged a return spring 38 for returning the piston 37 rightwardly of FIG. 1. On the rear end of the cylinder tube 35, there is fixed an annular stopper plate 39, in which is arranged movably back and forth a valve sleeve 40 extending back and forth in the axial direction. In the inner circumference of the valve sleeve 40, there is held liquid-tight in sliding contact a stem 37a forming the rear end of the afore-mentioned piston 37.

Figure 2:
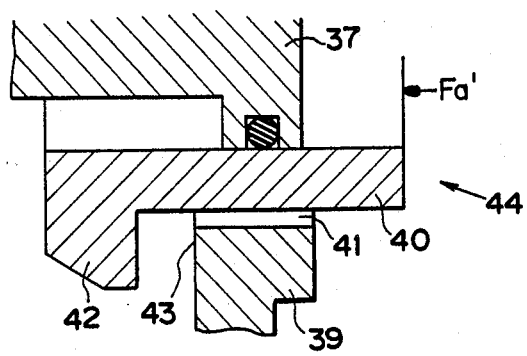
FIG. 2 is a section showing a portion corresponding to valve means of the embodiment.

Between the outer circumference of the valve sleeve 40 and the inner circumference of the stopper plate 39, as shown in an enlarged scale in FIG. 2, there is formed a small clearance for providing an oil passage 41. The portion of the valve sleeve 40 projecting forward from the stopper plate 39 extends radially outward, as indicated at 42, and the surface of this extension 42 facing the front surface of the stopper plate 39 comes into close contact with the stopper plate 39 to close the oil passage 41 between itself and the inner circumference of the stopper plate 39. Thus, here is constructed a valve mechanism 44 which has the valve sleeve 40 as its valve member and the front surface of the stopper plate 39 as its valve seat 43.

Figure 3:
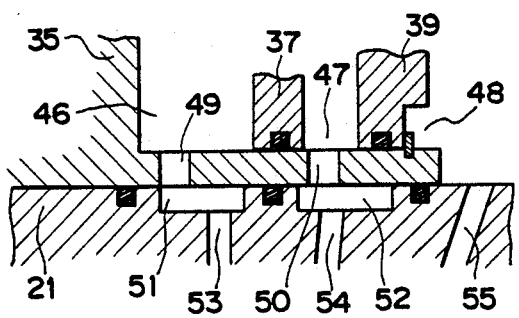
FIG. 3 is a section showing a portion corresponding to the structure of an oil passage.

The chamber 36 accommodating the aforementioned servo-cylinder 33 has its rear end (i.e., the righthand end, as seen in FIG. 1) sealed up by an end plate 45 to form therein a chamber 46 in front of the piston 37, a first oil chamber 47 between the piston 37 and the stopper plate 39, and a second oil chamber 48 between the stopper plate 39 and the end plate 45. The structure for supplying and discharging the oil pressure to chamber 46 and oil chambers 47 and 48 will be described in the following. As shown in FIGS. 1 and 3, the cylinder tube 35 is formed in its circumferential wall with an oil port 49 opened into the chamber 46 and an oil port 50 opened into the first oil chamber 47. On the other hand, the cylinder tube 35 is formed in its inner face within the ranges of the strokes of the oil ports 49 and 50, respectively, with long grooves 51 and 52 which have communications with oil passages 53 and 54 extending through the transmission casing 21. An oil passage 55 communicating with the second oil chamber 48 is formed through the transmission casing 21. Here: the oil passage 53 has communication with a predetermined change-over valve (although not shown); the oil passage 54 has communication with another change-over valve (although not shown) through an accumulator 56 and an orifice 57; and the oil passage 55 has communication with still another change-over valve (although not shown).

Moreover, the cylinder tube 35 of the hydraulic servo-cylinder 33 thus constructed and the aforementioned anchor rod 25 are so connected to each other through a connecting rod 58 and the aforementioned flange 28 that they may move together back and forth.

Here, the brake system thus far described performs the operations similar to those of a one-way clutch, as will be described hereinafter. In order to ensure the operations, the brake system is constructed such that the pushing force of the piston rod 34 when the hydraulic pressure is supplied to the aforementioned first oil chamber 47 is substantially equal to that of the anchor rod 25. More specifically, the optimum timings of applying the braking force according to the revolving direction and releasing the same should satisfy the following requirements:

(1) When the turning moment of the brake drum 20 is in the deenergizing direction (as indicated at arrow B in FIG. 1), the cylinder tube 35 is moved backward (to the right of FIG. 1) to open the valve sleeve 40; and (2) When the turning moment of the brake drum 20 is in the energizing direction (as indicated at arrow A in FIG. 1), the cylinder tube 35 is moved forward (to the left of FIG. 1). Here: the pushing force (in the leftward direction of FIG. 1) by the piston rod 34 in case the oil pressure is supplied to the first oil chamber 47 is designated at Fa; the pushing force (i.e., the pulling force of the connecting rod 58) by the anchor rod 25 in the rightward direction of FIG. 1 is designated at Fb; the pushing force of the valve sleeve 40 by the end plate 45 is designated at Fa'; and the pushing force of the anchor rod 25 by the adjust bolt 26 in the rightward direction of FIG. 1 is designated at Fb'. With these designations, the following equation holds from the above-specified requirement (1):

$$e^{\mu\beta}(Fa+Fa')=Fb+Fb',$$

wherein:
 e: the base of a natural logarithm;
 $\mu$: the coefficient of friction between the brake band and the brake drum; and
 $\beta$: the winding angle of the brake band.
Because Fa'=0 and Fb'>0, the following inequalities hold:

$$e^{\mu\beta} \cdot Fa > Fb; \text{ and} \tag{1}$$
$$Fb/Fa < e^{\mu\beta}.$$

From the above-specified requirement (2), the following inequalities hold:

$$Fa < e^{\mu\beta} \cdot Fb; \text{ and} \tag{2}$$
$$1/e^{\mu\beta} < Fb/Fa.$$

Hence, the following inequalities have to hold from the inequalities (1) and (2):

$$1/e^{\mu\beta} < Fb/Fa < e^{\mu\beta}.$$

Considering the sliding resistances of the individual fitting portions, the optimum condition is Fa≈Fb.

Figure 7:
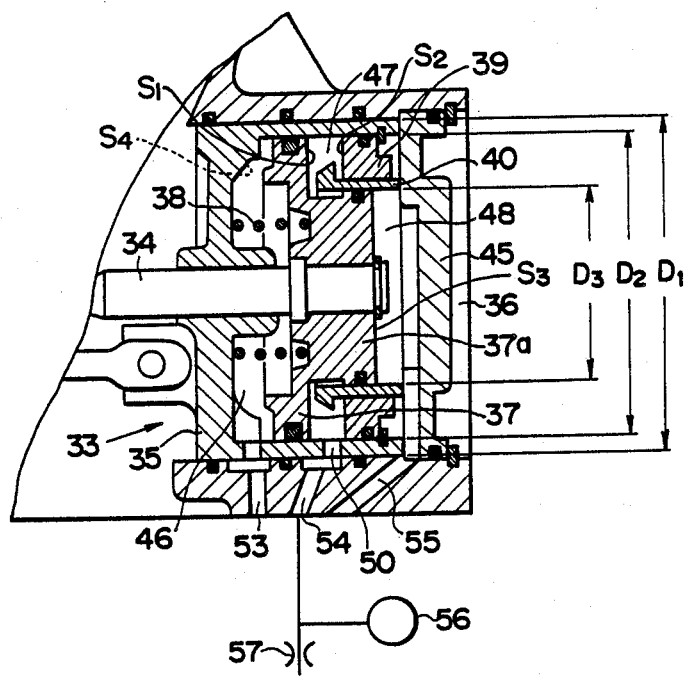
FIG. 7 is a section showing a portion of the embodiment for indicating the sizes of the individual portions of a hydraulic servo-cylinder.

In the aforementioned brake system, therefore, the pressure receiving area S1 $(=\pi(D_2^2-D_3^2)/4)$ of the piston 37 in case the oil pressure is supplied to the first oil chamber 47 is equal to the pressure receiving area S2 of the stopper plate 39. Here, $D_2$ designates the external diameter of the piston 37 whereas $D_3$ designates the external diameter of the stem 37a of the piston 37, as seen from FIG. 7. Incidentally, the external diameter of the cylinder tube is designated at $D_1$.

Next, the operations of the brake system thus constructed will be described in the following.

FIG. 1 shows a state out of brakeage, in which the first and second oil chambers 47 and 48 are evacuated so that the anchor rod 25 is retracted to the leftward end, as shown, whereas the piston 37 of the hydraulic servo-cylinder 33 is returned to the right by the action of the return spring 38. As a result, the brake band 22 is opened to permit free revolutions of the brake drum 20. In this state, the speed changes are set at the forward first and third speeds and at the reverse in case the present invention is applied to the second brake B2 of the automatic transmission having the structure shown in FIG. 17.

Figure 4:
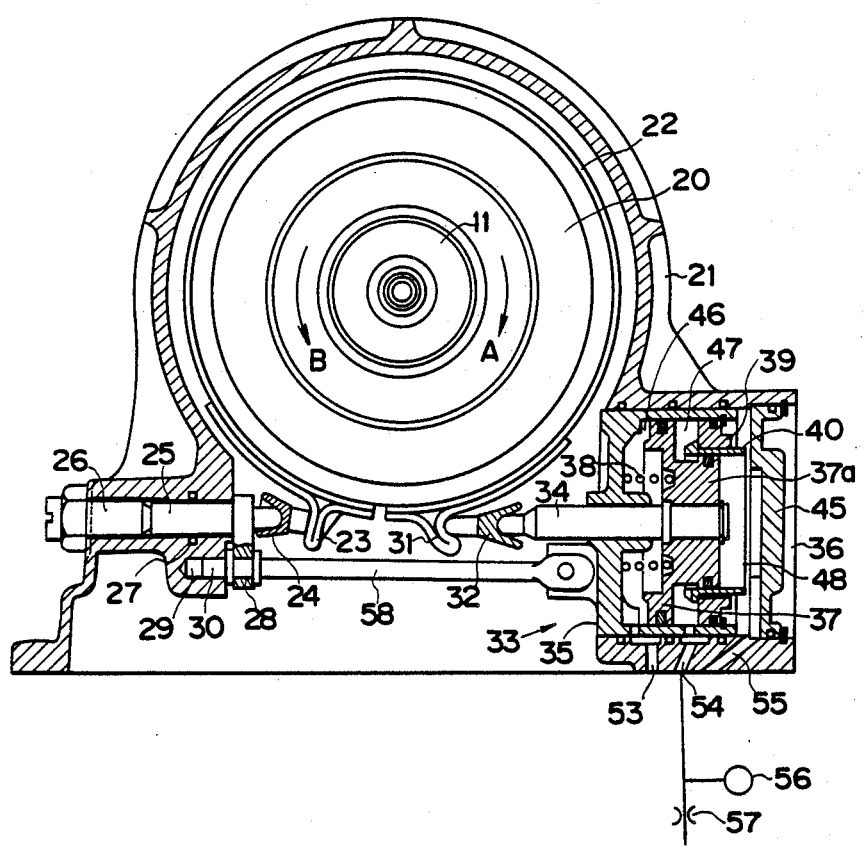
FIG. 4 is a section showing an engaged state.

On the contrary, FIG. 4 shows the state of the forward second speed, in which the brake drum 20 is braked. In this state, the aforementioned first and second oil chambers 47 and 48 are supplied with the oil pressure by way of the oil passages 54 and 55, respectively. In this case, the aforementioned valve sleeve 40 is pushed rightwardly of the drawing, because of a wider pressure receiving area at the first oil chamber 47, to bring its extension 42 into close contact with the valve seat 43 to shut off the oil passage 41. When the cylinder tube 35 advances to the left, the piston 37 also advances so that the second anchor 31 approaches the first anchor 23. As a result, the brake band 22 fastens the brake drum 20 so that the brake drum 20 is braked to have its revolutions blocked. In this state, the torque is applied in the direction of the arrow A to the brake drum 20.

Here, if the oil pressure in the second oil chamber 48 is sufficiently high, the cylinder tube 35 is not retracted to the right even if the brake drum 20 revolves in the deenergizing direction, as indicated by the arrow B, so that the brake drum 20 can be continuously braked to ensure the braking effect upon the engine.

Figure 5:
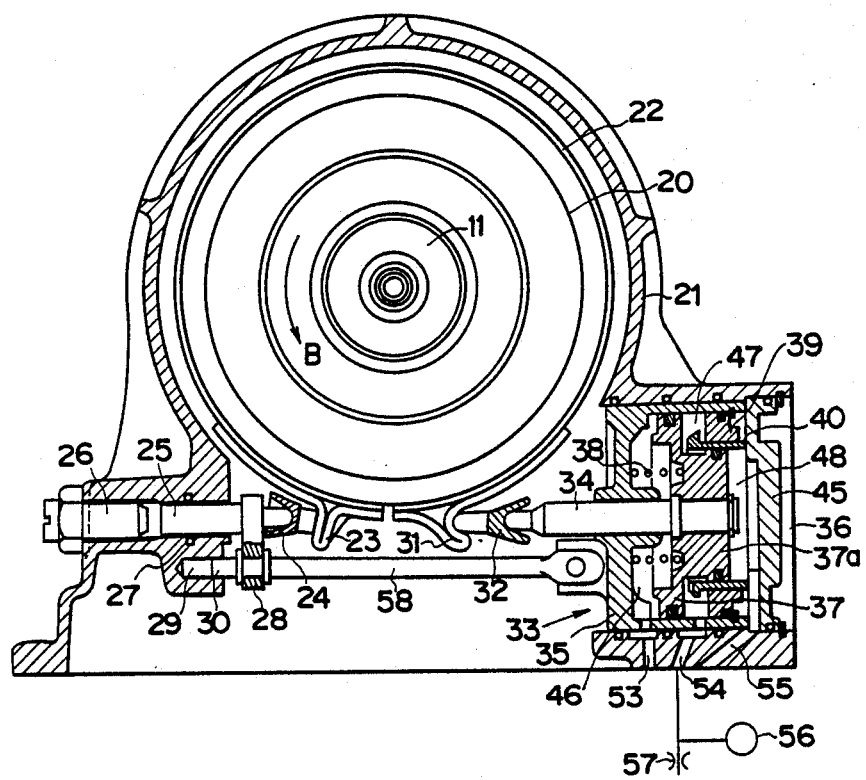
FIG. 5 is a section showing a released state when the valve means operates.
Figure 17:
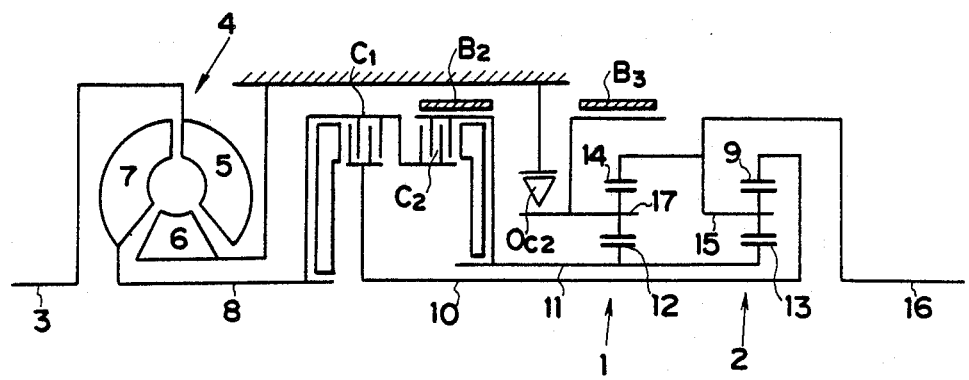
FIG. 17 is a skelton showing the structure of another example of the automatic transmission.

In the upshift from the forward second to third speeds, the automatic transmission shown in FIG. 17 has its second clutch C2 engaged and its second brake B2 released. For these operations, the oil passage 55 leading to the second oil chamber 48 is first switched to the drain in response to a speed change instructing signal to the third speed, and the oil pressure is gradually supplied through the accumulator and so on to the second clutch C2 shown in FIG. 17. Simultaneously with this, the oil passage 54 leasing to the first oil chamber 47 is evacuated. Since this oil passage 54 communicates with the accumulator 56 and the orifice 57, the pressure drop of the first oil chamber 47 gently occurs so that the brake band 22 fastens the brake drum 20 for a while to continue its braking operation. When the oil pressure in the second clutch C2 gradually rises until its transmission torque reaches a clutch torque capable of sufficiently transmitting the engine torque, the torque in the direction of the arrow B is applied to the brake drum 20. At this instant, the fastening action by the brake band is continued together with the evacuation of the aforementioned second oil chamber 48 so that the cylinder tube 35 is moved to the right together with the anchor rod 25 by the force of the brake drum 20 but without any drag. FIG. 5 shows a state after this movement, in which the valve sleeve 40 has its rear end (i.e., the righthand end of the drawing) abutting against the end plate 45 so that the valve sleeve 40 is moved to the left relative to the stopper plate 39 to bring its extension 42 apart from the valve seat 43 thereby to open the oil passage 41. As a result, the oil pressure in the first oil chamber 47 is abruptly released by way of the oil passage 41, the second oil chamber 48 and the oil passage 55 so that the piston 37 is retracted to the right of the drawing by the pushing force of the return spring 38. In accordance with this retraction, the fastening operation by the brake band 22 is released to permit free revolutions of the brake drum 20. In the brake system described above, more specifically, the release of the braking operation of the brake drum 22 is automatically accomplished in its revolving direction by the torque. In other words, the brake drum 20 acts as a one-way clutch so that a smooth speed change can be attained without any accurate control of the timing of evacuation for releasing the brakeage.

Incidentally, the embodiment described above has its oil passage 54 connected with the accumulator 56 and the orifice 57 because the fastening operation of the brake drum 20 by the brake band 22 has to be continued before the valve mechanism 44 operates to evacuate the first oil chamber 47. Depending upon the characteristics of those accumulator 56 and the orifice 57, therefore, the brake releasing timing may change to require adjustment of the accumulator 56 and the orifice 57. However, the influences of the accumulator 56 can be avoided with respect to the brake releasing timing if the brake system is constructed to have a structure shown in FIG. 6.

Figure 6:
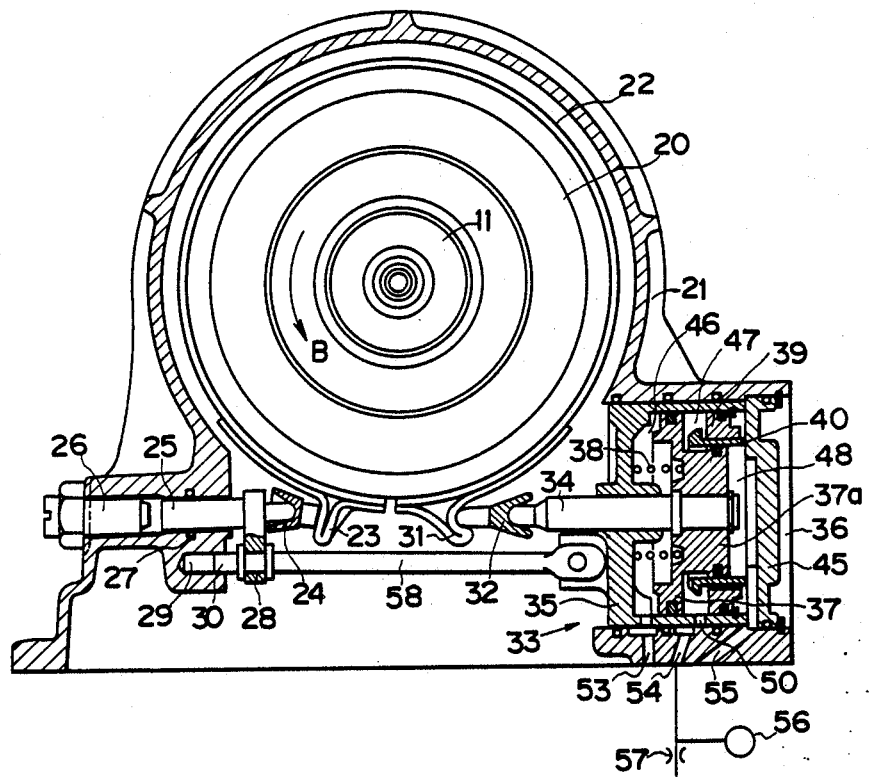
FIG. 6 is a section showing a second embodiment of the present invention.

FIG. 6 is a section showing a second embodiment of the present invention. The brake system, as shown, is improved over the foregoing embodiment such that the oil passage 54 for pumping the oil pressure into or out of the first oil chamber 47 has its end opened at the cylinder tube 35 directly into the inner circumference of the chamber 36 not through the aforementioned long groove 52, and such that the opening has an area substantially equal to that of the oil port 50 formed in the cylinder tube 35 and is positioned to have communication with the oil port 50 in case the cylinder tube 35 advances to the left of the drawing.

With the structure shown in FIG. 6, therefore, the brake drum 20 is subjected to the torque in the direction of the arrow B with the brake band 22 being fastened. In case the cylinder tube 35 is accordingly retracted to the right of the drawing, the oil port 50 opened in the first oil chamber 47 is misaligned from the oil passage 54 to close the first oil chamber 47 so that the oil pressure in the first oil chamber 47 is maintained. After this, the valve sleeve 40 is opened to evacuate the first oil chamber 47. As a result, the brake opening timing is not influenced by the external factors of the accumulator and so on to eliminate the works of adjusting the characteristics of the accumulator and so on.

In the structure thus far described, the anchors 23 and 31 of the brake band 22 are not fixed but can move together with the anchor rod 25 and the cylinder tube 35 within a predetermined range. In the released state shown in FIG. 1, for example, the vibrations accompanying the run of the automobile may chatter the anchor rod 25 and the cylinder tube 35. In order to eliminate this disadvantage, it is preferable to supply the aforementioned second oil chamber 48 with the oil pressure even in the released state. Then, the cylinder tube 35 advances to the left of the drawing to hold the anchor rod 25 at the rear end through the connecting rod 58 so that the anchor rod 25 and the cylinder tube 35 are substantially fixed to eliminate the chattering. In this case, the oil pressure is also supplied to the aforementioned chamber 46 so as to prevent the piston 37 from being moved forward by the oil pressure supplied to the second oil chamber 48.

Figure 8:
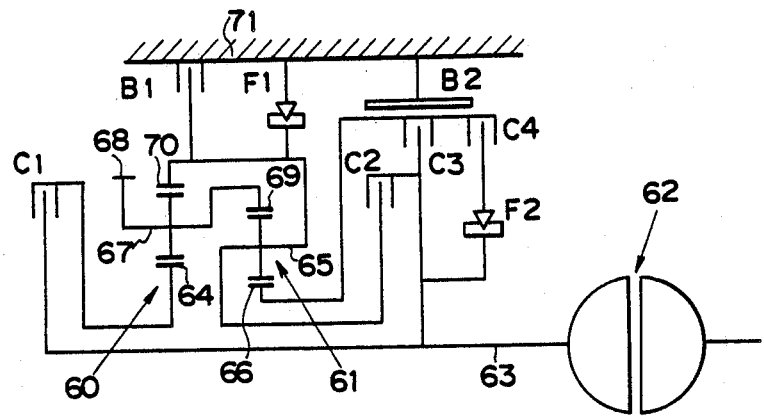
FIG. 8 is a skelton showing the gear train of an automatic transmission for setting forward four speeds and one backward speed.

In the embodiments thus far described, the automatic transmission for forward three and reverse one speed changes has its revolutions interrupted in the energizing direction to set the forward second speed. As has been described in connection with the first embodiment, the aforementioned brake system is freed from the one-way characteristics by raising the oil pressure in the second oil chamber 48 but can interrupt the revolutions in the deenergizing direction. Therefore, the brake system of the present invention can also be applied to an automatic transmission for forward four and reverse one speed changes, as shown in FIG. 8. Specifically, the automatic transmission shown in FIG. 8 is constructed mainly of two sets of planetary gear mechanisms 60 and 61. A first clutch C1 is interposed between an input shaft 63 connected to a torque converter 62 and a sun gear 64 of the first planetary gear mechanism 60, as located at the lefthand side of FIG. 8. A second clutch C2 is interposed between the input shaft 63 and a carrier 65 in the second planetary gear mechanism 61, and a third clutch C3 is interposed between the input shaft 63 and a sun gear 66 in the second planetary gear mechanism 61. On the other hand, a carrier 67 in the first planetary gear mechanism 60 is connected to an output member 68 such as the counter gear and to a ring gear 69 of the second planetary gear mechanism 61. A ring gear 70 of the first planetary gear mechanism 60 is connected to the carrier 65 of the second planetary gear mechanism 61. A first one-way clutch F1 for blocking the backward revolutions (which are opposite to the revolutions of the input shaft 63) of the ring gear 70 of the first planetary gear mechanism 60 and the carrier 65 of the second planetary gear mechanism 61 is interposed between them and a casing 71. In parallel with that first one-way clutch F1, there is arranged a first brake B1 acting as a multi-disc clutch. Moreover, a second brake B2 acting as a band brake for blocking the revolutions of the sun gear 66 of the second planetary gear mechanism 61 is interposed between it and the casing 71. Between the sun gear 66 and the input shaft 63, there are interposed a fourth clutch C4, which is in parallel with the aforementioned third clutch C3, and a second one-way clutch F2 which is in series with the fourth clutch C4 for blocking the relative revolutions of the input shaft 63 in the forward and backward directions.

The operations of the automatic transmission are exemplified in Table 3. In Table 3: circles indicate the states in engagement; blanks indicate the states out of engagement; and parenthesized circles indicate the states in engagement when the automobile is braked by the engine.

TABLE 3

|     | C1 | C2 | C3 | C4 | B1  | B2 | F1 | F2 |
|-----|----|----|----|----|-----|----|----|----|
| 1st | O  |    |    |    | (O) |    | O  |    |
| 2nd | O  |    |    | O  |     | O  |    |    |
| 3rd | O  | O  |    | O  |     |    |    | O  |
| 4th |    | O  |    | O  |     | O  |    |    |
| Rev |    |    | O  |    | O   |    |    |    |

If, moreover, the aforementioned brake system is used as the second brake B2 of the automatic transmission described above, the revolutions of the sun gear 66 in the energizing direction are interrupted at the forward second speed, and the revolutions of the same in the deenergizing direction are interrupted at the forward fourth speed. More specifically, in the case of an upshift from the first to second speeds or in the case of a downshift from the third to second speeds, the anchors 23 and 31 are pushed in the directions to bring the piston rod 34 and the anchor rod 25 close to each other if the first oil chamber 47 is supplied with the oil pressure, as has been described hereinbefore, so that the brake band 22 fastens the brake drum 20. In this case, the cylinder tube 35 is moved by the revolutions of the brake drum 20 in the direction not to open the aforementioned valve mechanism 44 so that the brake drum 20 is braked to set the forward second speed. In an upshift to the third speed from this second speed, on the other hand, the second clutch C2 is engaged to begin the revolutions of the brake drum 20 in the deenergizing direction. Then, the cylinder tube 35 is retracted, as described above, so that the valve sleeve 40 comes into abutment against the end plate 45 to effect the valve opening operation. As a result, the first oil chamber 47 is evacuated to release the brake drum from the braking operation. In other words, this braking operation can be released without any switching of the supply and release of the oil pressure, thus exhibiting the one-way characteristics.

In case the forward fourth speed is to be set, on the other hand, both the first and second oil chambers 47 and 48 are supplied with the oil pressure. As a result, the hydraulic servo-cylinder 33 advances in its entirety against the load resulting from the revolutions of the brake drum 20 in the deenergizing direction so that the anchor rod 25 comes into abutment against the adjust bolt 26 to receive the pushing force therefrom. At the same time, the piston rod 34 pushes the second anchor 31 to fasten the brake band 22 so that the revolutions of the brake drum 20 in the deenergizing direction are interrupted to set the forward fourth speed.

In order to ensure the aforementioned brakeage in the deenergizing direction, the area of the hydraulic servo-cylinder 33 for receiving the oil pressure supplied to the first and second oil chambers 47 and 48 is set in the following manner. If the force for the piston rod 34 to be pushed by the oil pressure supplied to the second oil chamber 48 is designated at Fc and if the pushing force by the anchor rod 25 is designated at Fd, the following equation has to hold so as to interrupt the revolutions in the denergizing direction:

$$e^{\mu\beta}(Fa+Fc)=Fb+Fd \quad (3).$$

Because Fa≈Fb, as has been described hereinbefore, the following relations are required for the equation (3) to stably hold:

Fb+Fd≦0; and Fa+Fc>0.

In case, therefore, the brake system is to be used as the second brake B2 of the automatic transmission shown in FIG. 8, the pressure receiving area S4 ($=\pi(D_1^2-D_3^2)/4$) (as seen from FIG. 7) of the hydraulic servo-cylinder 33 in the second oil chamber 48 in case the first and second oil chambers 47 and 48 are supplied with the oil pressure is set larger than the pressure receiving area S2 for establishing the pushing force of the anchor rod 25 (i.e., the tensile force of the connecting rod 58) in case the first oil chamber 47 is supplied with the oil pressure.

Incidentally, the braking operations of the brake drum 20 at the second and fourth speeds are different in the load torque, transmission torque capacity and pressure receiving area despite of the common oil pressure supplied In order to drop the shifting shocks at each speed, it is conceivable to set the second speed by supplying the first oil chamber 47 with the oil pressure and to set the fourth speed by supplying the first and second oil chambers 47 and 48 with the oil pressure. Then, the pressure receiving areas of the piston 37 for setting the individual speeds, i.e., the pressure receiving area S1 ($=\pi(D_2^2-D_3^2)/4$) (as seen from FIG. 7) when the first oil chamber 47 is supplied with the oil pressure and the pressure receiving area (S1+S3) ($=\pi(D_2^2-D_3^2)/4+\pi \cdot D_3^2/4$) (as seen from FIG. 7) when the first and second oil chambers 47 and 48 are supplied with the oil chamber are set to establish transmission torques matching the load torques at the respective speeds.

If the tooth number ratio (i.e., the ratio of the tooth number of the ring gear to the tooth number of the sun gear) of the first planetary gear mechanism 60 shown in FIG. 8 is designated at $\rho_r$, if the tooth number ratio of the second planetary gear mechanism 61 is designated at $\rho_f$, and if the turbine torque is designated at $T_t$, the load torque $T_2$ at the second speed is expressed by the following equation:

$$T_2=\rho_f T_t/(1+\rho_f)\rho_r,$$

whereas the load torque $T_4$ at the fourth speed is expressed by the following equation:

$$T_4=\rho_f T_t/(1+\rho_f).$$

In other words, the brake load torque $T_2$ at the second speed is $1/\rho_r$ times as high as the brake load torque $T_4$ at the fourth speed. At the upshifts to the second and fourth speeds, on the other hand, the inertia torque according to the changing (or reducing) rate of the engine r.p.m. is added to the above-specified load torque. Because the individual tooth number ratios $\rho_f$ and $\rho_r$ generally take a value of about 0.3 to 0.7, the load torque $T_2$ at the second speed is higher than the load torque $T_4$ at the fourth speed. If the speed change is terminated while maintaining the brake transmission torque during the speed change slightly higher than the steady torque at a subsequent speed, any abrupt reduction in the engine r.p.m. is not caused, but an abrupt change in the output shaft torque due to the inertia torque can be prevented to reduce the shifting shocks On condition that the oil pressure to be supplied to the hydraulic servo-piston 33 is constant, the structure may be so set that the brake transmission torque at the upshift to the second speed is about $1/\rho_r$ times as high as that at the upshift to the fourth speed.

Since, on the other hand, the revolutions of the brake drum 20 at the upshift to the second speed are in the energizing direction, the transmission torque capacity $T_2'$ of the brake band 22 to the oil pressure for establishing the pushing force by the piston rod 34 is expressed by the following equation:

$$T_2'=(Sp-F)R(e^{\mu\beta}-1),$$

wherein:
S: the pressure receiving area;
p: the oil pressure;
F: the elastic force of the return spring 38; and
R: the radius of the brake drum 20.

Since, on the other hand, the brake drum 20 revolves in the deenergizing direction at the upshift to the fourth speed, the transmission torque capacity $T_4'$ of the brake band 22 is expressed by the following equation:

$$T_4'=(Sp-F)R(e^{\mu\beta}-1)/e^{\mu\beta}.$$

Under the conditions of an equal pressure receiving area and an equal oil pressure, therefore, the brake transmission torque capacity $T_2'$ at the upshift to the second speed is $e^{\mu\beta}$ times as high as the brake transmission torque capacity $T_4'$ at the upshift to the fourth speed.

In the brake system described above, more specifically, the pressure receiving area for supplying the first oil chamber 47 with the oil pressure so as to set the second speed is expressed by S1, and the pressure receiving area for supplying the first and second oil chambers 47 and 48 with the oil pressure so as to set the fourth speed is expressed by (S1+S3). These areas are set to establish the transmission torques matching the load torques at the aforementioned respective speeds for a common oil pressure while considering the differences in the load torque and the transmission torque capacities at those respective speeds. As a result, the shifting shocks are improved better at the shifts to not only the second speed but also the fourth speed. In other words, it is unnecessary to control the accumulator back pressure in accordance with the speed changes. Thus, the structure can be simplified to drop the cost.

As has been described hereinbefore, according to the fundamental structure of the present invention, the brake system for use in an automatic transmission to effect the braking operation by fastening the outer circumference of a revolving member with a brake band is constructed such that the brake band has its one end connected to the piston rod of a hydraulic cylinder and its other end connected to an anchor rod made movable back and forth, such that the hydraulic cylinder has its cylinder tube held movably back and forth and connected to the anchor rod in a manner to move together back and forth, and such that there is provided a valve mechanism which is opened by the movement of the cylinder tube receiving a force in a predetermined direction from the brake band to either apply a fluid pressure in a direction to reduce the fastening force by the brake band or release the same pressure. More specific modes of embodiment will be enumerated in the following.

The valve mechanism may be constructed to have a valve member projecting from the cylinder tube in one of the moving directions of the same. The projecting end of the valve member may abut a stationary portion, which is disposed apart from the cylinder tube in a predetermined position at one side of the moving direction of the cylinder tube.

On the other hand, the valve mechanism may be interposed between the aforementioned oil chamber and an oil chamber formed in the hydraulic cylinder and adjacent to the former oil chamber. In this case, the valve member may be interposed between those oil chambers and may have its one end projecting toward an end plate so that it may abut against the end plate, as the cylinder tube moves toward the end plate, to open the valve.

Figure 18:
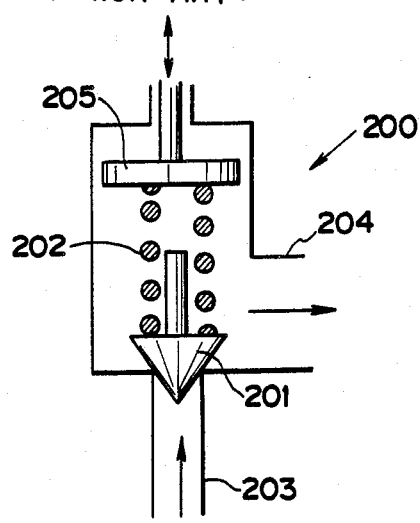
FIG. 18 is a schematic view showing a poppet valve according to prior art.

With the valve mechanism thus constructed, the valve member itself performs a function to transmit the valve opening external force to itself so that the valve opening timing can be accurate. As a result, the valve mechanism can be shortened and made compact with a reduced number of components. FIG. 18 is a schematic diagram showing a poppet valve according to the prior art. A poppet 201 is forced onto the opening of a first oil passage 203 by the action of a spring 202. As the supply oil pressure rises to retract the poppet 201 against the elastic force of the spring 202, it opens the opening of the first oil passage 203. As a result, communication is established between the first oil passage 203 and a second oil passage 204, and a moving plate 205 supporting the end of the spring 202 is moved in accordance with the movement of an external member such as the aforementioned cylinder tube 35 to suitably adjust the valve opening timing by the poppet 201. The poppet valve 200 thus constructed requires a chamber for accommodating the poppet 201 and the spring 202, and still worse, the motions of the external member are not transmitted directly to the poppet 201. As a result, the valve opening timing may fail to conform to the expected one. On the contrary, the aforementioned valve mechanism 44 can have an accurate valve opening timing because the motions of the cylinder tube 35 are transmitted directly to the valve sleeve 40.

Figure 19:
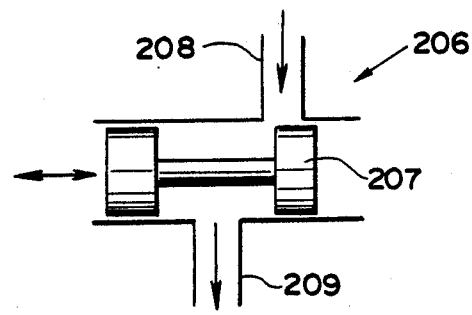
FIG. 19 is a schematic view showing an existing spool valve according to the prior art.

On the other hand, FIG. 19 is a schematic diagram showing a spool valve 206 generally existing in the prior art. This spool valve 206 is constructed such that the motions of an external member such as the aforementioned cylinder tube 35 are transmitted to a spool 207 to establish or interrupt communication between a first oil passage 208 and a second oil passage 209. This structure will be able to transmit the motions of the external member directly to the spool 207. This transmission requires not only some connecting member but also a chamber for accommodating the spool 207 so that the entire structure has a large size. On the contrary, the aforementioned valve mechanism 44 requires neither any accommodating chamber nor the above-specified oil passage because the valve sleeve 40 provides the direct connection between the first and second oil chambers 47 and 48, so that the brake system of the present invention can be made compact in this respect.

The brake system of the present invention can be constructed by fitting the aforementioned hydraulic cylinder movably back and forth in the chamber formed in the transmission casing, by closing the open end of the chamber with the end plate, by forming the oil chamber capable of being supplied with and relieved from the oil pressure between the end plate and the hydraulic cylinder, and by supplying the oil chamber with the oil pressure to fix the cylinder tube to the aforementioned anchor rod. This structure can prevent the cylinder tube from any unnecessary motion, which might otherwise cause the chattering.

The cylinder tube is formed with the oil port opened into the oil chamber in the hydraulic cylinder, and the transmission casing is formed with the oil passage opened into that oil port so that the oil port opened into the oil chamber to supply the oil pressure for fastening the brake band can go out of the afore-mentioned oil passage until it is closed. This structure can maintain the fastened state of the brake band without any special device or adjustment until the valve mechanism operates.

The brake system according to the present invention is intended to effect and release the brakeage so as to set a predetermined speed change. It is, therefore, preferable to accomplish the braking and releasing operations by supplying and discharging the oil pressure to and from the aforementioned first and second oil chambers 47 and 48 by the action of the system shown in FIG. 9. Incidentally, FIG. 9 is reversed in its righthand and lefthand sides from FIGS. 1 and 4 to 6 for convenience of illustration.

Figure 9:
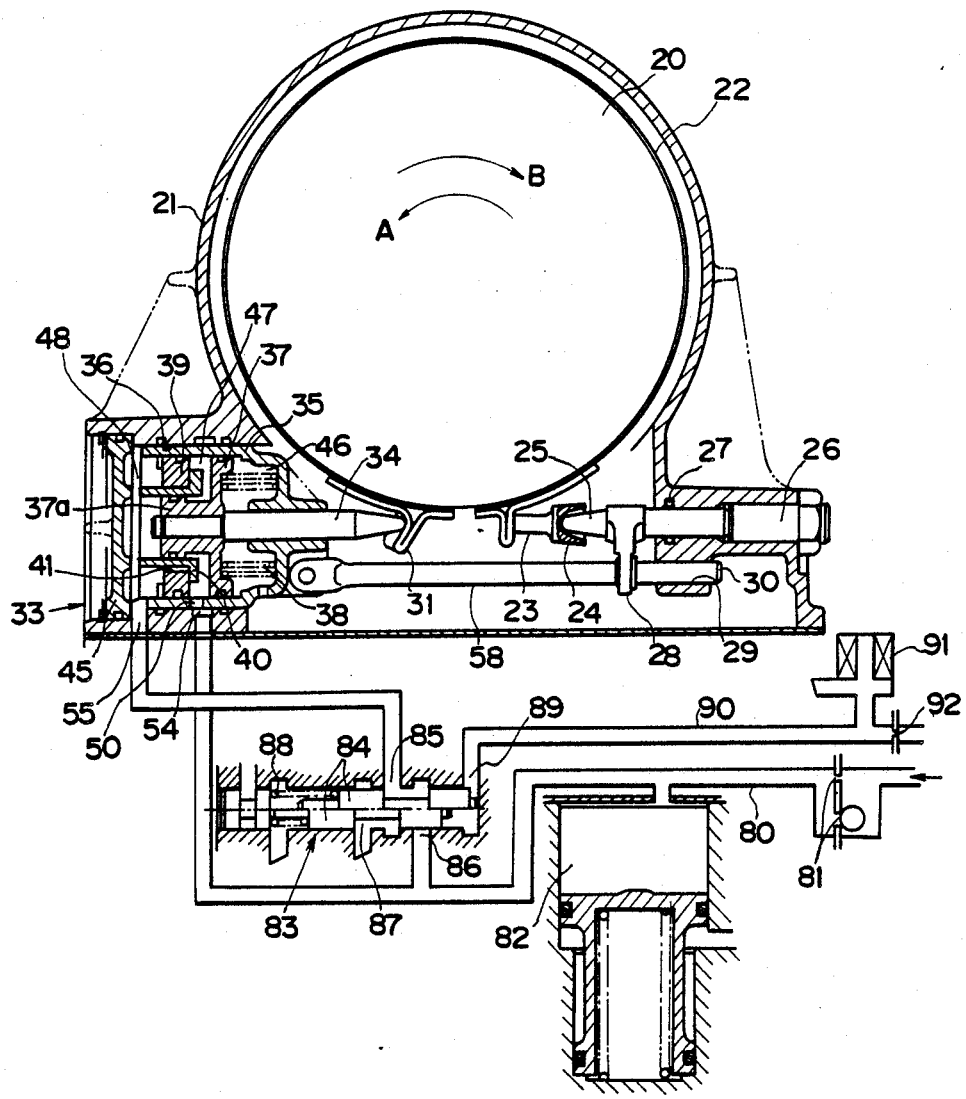
FIG. 9 is a section showing a third embodiment of the present invention.

In the brake system shown in FIG. 9, the push rod 34 is connected directly to the second anchor 31 not through the cap 32. Moreover, the first oil chamber 47 is connected to a line pressure oil passage 80 for supplying the line pressure when the forward second and fourth speeds are to be set. This line pressure oil passage 80 may be connected a 1-2 shift valve and a 3-4 shift valve (although neither shown) and branched from the oil passage for supplying the line pressure when the forward second and fourth speeds are to be set. An orifice 81 and an accumulator 82 are incorporated into the line pressure oil passage 80. On the other hand, the second oil chamber 48 is connected through a change-over valve (e.g., brake servo-valve) to the line pressure oil passage 80 in a position closer to the first oil chamber 47 than the accumulator 82. The change-over valve 83 switches the communication of a first port 85 connected to the second oil chamber 48 selectively with either of a second port 86 connected to the line pressure oil passage 80 or a drain port 87. At one end of the spool 84, there is arranged a spring 88 for pushing the spool 84. A control pressure oil passage 90 is connected to a control pressure port 89 which is formed at the other end of the spring 88. The control pressure oil passage 90 is one which is connected to a hydraulic pump (although not shown), for example, and always supplied with the line pressure or which is supplied with the line pressure from a manual valve (although not shown) when the automatic transmission is set in the drive (D) range. The oil passage 90 is equipped with an electromagnetic valve 91 for drainage and an orifice 92. Incidentally, the electromagnetic valve 91 may be of the type in which it is opened into the drain when energized, or vice versa. However, the following description will be made by using the electromagnetic valve 91 of the former type.

The remaining structure is similar to that of the system shown in FIG. 6, and the members of FIG. 9 shared with those of FIG. 6 are designated at the common reference numerals.

Next, the operations of the brake system thus constructed will be described in the following.

This brake system is used as the second brake B2 of the automatic transmission shown in FIG. 8 so that it is engaged at the forward second and fourth speeds, as has been exemplified in Table 3. The operations will be described in the cases of upshifts to those speeds or downshifts from those speeds. Here, at each shift pattern, the states of the electromagnetic valve 91, the port of the change-over valve 83 having communication with the first port 85, and the existence and inexistence of brakeage are exemplified in Table 4.

TABLE 4

| | EM Valve | Communicating Port | Brakeage |
|---|---|---|---|
| 1st | ON | Line Pressure | Backward |
| ↓ | | | |
| 2nd | ON | Line Pressure | Backward Brakeage |
| 2nd | ON | Line Pressure | Backward Brakeage |
| ↓ | | | |
| 1st | ON | Line Pressure | Backward |
| 2nd | ON | Line Pressure | Backward Brakeage |
| ↓ | OFF | Drainage | |
| Shift 3rd | OFF | Drainage | Forward |
| Pattern 3rd | OFF | Drainage | Forward |
| ↓ | after Shift | | |
| 2nd | ON | Line Pressure | Backward Brakeage |
| 3rd | OFF | Drainage | Forward |
| ↓ | | | |
| 4th | ON | Line Pressure | Forward Brakeage |
| 4th | ON | Line Pressure | Forward Brakeage |
| ↓ | after Shift | | |
| 3rd | OFF | Drainage | Forward |

In the case of the upshift from first to second speeds, the second oil chamber is caused to communication with the line pressure oil passage 80 through the change-over valve 83. Specifically, the aforementioned electromagnetic valve 91 is energized (or ON) to evacuate the control pressure oil passage 90 so that the spool 84 of the change-over valve 83 is set in the upper position, as shown in FIG. 9, to establish the communication of the first port 85 with the second port 86. Since, in the first forward state, no line pressure is supplied to the line pressure oil passage 80, nor is supplied the oil pressure to the individual oil chambers 47 and 48 of the hydraulic servo-cylinder 33 so that the push rod 34 is returned by the return spring 38 to release the brake system. If, in this state, the supply passage of the line pressure is so switched that the 1-2 shift valve may be actuated to set the forward second speed, the line pressure is supplied to the line pressure oil passage 80 so that it is supplied directly to the first oil chamber 47 and through the change-over valve 83 to the second oil chamber 48. Consequently, both the cylinder tube 35 and its piston 37 are pushed in the rightward direction of FIG. 9, i.e., in the fastening direction so that the brake band 22 is fastened to brake the brake drum 20. As a result, the sun gear 66 of the second planetary gear mechanism 61 shown in FIG. 8 is fixed. In this case, the brake drum 20 is revolved backward, as indicated at letter A in FIG. 9, so that the revolutions of of the brake drum 20 are in the same direction as the pushing force by the push rod 34. The line pressure is supplied to the individual oil chambers 47 and 48 through the accumulator 82 so that it rises slowly in accordance with the characteristics of the accumulator 82. This establishes no abrupt torque fluctuations so that the shocks at the speed change can be prevented. At this time, the first one-way clutch F1 engaged at the first speed is released at the optimum timing (i.e., at the instant when the ring gear 70 of the first planetary gear mechanism 60 begins its forward revolutions).

In the case of the downshift from the second to first speeds, on the contrary, it is sufficient to leave the electromagnetic valve 91 ON. If both the oil chambers 47 and 48 are maintained in the state to communicate with the line pressure oil passage 80, the oil pressure in the oil pressure oil passage 80 is released through the shift valve in accordance with the downshift from the second to first speeds so that the respective oil pressures in the oil chambers 47 and 48 gradually drop through the accumulator 82. As a result, the push rod 34 is gradually returned by the return spring 38 to drop the braking torque. Then, the brake drum 20, i.e., the sun gear 66 of the second planetary gear mechanism 61 gradually begins its revolutions, and the ring gear 70 of the first planetary gear mechanism 60 reduces its number of revolutions until it revolves backward. At this instant, the first one-way clutch F1 is engaged to set the first forward speed.

In the state of the second speed, the electromagnetic valve 91 is ON to release the control pressure and to block the revolutions of the brake drum 20. In the case of an upshift from this state to the third speed, the energization of the electromagnetic valve 91 is interrupted (i.e., OFF) simultaneously with the judgement of the upshift to the third speed to supply the control pressure to the control pressure port 89 of the change-over valve 83. As a result, the spool 84 of the change-over valve 83 is moved to the lower position, as shown in FIG. 9, while compressing the spring 88 to cause the first port 85 to communication with the drain port 87. In other words, the second oil chamber 48 is directly drained to have its oil pressure abruptly dropped. As a result, the push rod 34 is pushed for the braking effect only by the oil pressure in the first oil chamber 47. In the course of the upshift from the second to third speeds, the oil pressure of the aforementioned second clutch C2 rises until the torque of the second clutch C2 exceeds the turbine torque. Then, the brake drum 20 (or the sun gear 66) will revolve in the forward (deenergizing) direction, as indicated at letter B in FIG. 9. As a result, the hydraulic servo-cylinder 33 is moved leftwardly of FIG. 9 together with the anchor rod 25 because of the evacuation of the second oil chamber 48. When the hydraulic servo-cylinder 33 is retracted to some extent, the aforementioned valve sleeve 40 comes into abutment against the end plate 45 to bring its extension 42 apart from the valve seat 43 forming the front face of the stopper plate 39. Moreover, the oil port 50 and the oil passage 54 are misaligned to block the first oil chamber 47 from the line pressure oil passage 80 so that the oil pressure in the first oil chamber 47 is abruptly released through the second oil chamber 48. As a result, the pushing force of the push rod 34 disappears to release the brake drum 20 from the brakeage. In the upshift from the second to third speeds, more specifically, the brake drum 20 begins to revolve so that it is released from its brakeage to act as a one-way clutch. Thus, the engagement of the second clutch C2 and the release of the second brake B2 are completely timed to eliminate any possibility of occurrence of the shocks at the speed change.

In the case of the downshift from the forward third to second speeds, the change-over valve 83 is left as it is, to have the second oil chamber 48 communicating with the drain. In case the shift to the second speed is judged to supply the line pressure to the line pressure oil passage 80 so that the oil pressure in the first oil chamber 47 rises in accordance with the characteristics of the accumulator 82, the brake drum 20 is revolving forward unless the second clutch C2 is sufficiently released. If, in this state, a frictional force is established between the brake band 22 and the brake drum 20 as result of the rise in the oil pressure in the first oil chamber 47, the hydraulic servo-cylinder 33 is retracted by the revolving force of the brake drum 20. As a result, the valve sleeve 40 comes into abutment against the end plate 45 to open the oil passage 41. Even if, at this instant, the first oil chamber 47 is supplied with the oil pressure, the brake band 22 accordingly comes into contact with the brake drum 20 so that the first oil chamber 47 is evacuated, as has been described hereinbefore. As a result, the brake band 22 repeatedly comes into and out of contact with the brake drum 20 while leaving the brake drum 20 out of brakeage. As the second clutch C2 is gradually released to have its clutch torque reduced, the brake drum 20 begins to revolve backward (i.e., in the energizing direction), as has been described hereinbefore. At this time, the brake band 22 is in contact with the brake drum 20 to move the hydraulic servo-cylinder 33 rightwardly of FIG. 9. As a result, the oil passage 41 leading from the first oil chamber 47 to the second oil chamber 48 is closed to abruptly boost the oil pressure in the first oil chamber 47 so that the brake band 22 is fastened to brake the brake drum 20. If, in this case, the automobile comes into its coasting state while being braked by the engine, the brake drum 20 revolves forward (i.e., in the deenergizing direction) so that a leftward force, as seen from FIG. 9, is applied to the hydraulic servo-cylinder 33. If this servo-cylinder 33 is thus retracted, the valve mechanism 44 is caused to accomplish the valve opening operations, as has been described hereinbefore, to drain the first oil chamber 47 via the second oil chamber 48. In accordance with this, the brake drum 20 is released from the brakeage and the line pressure. In order to prevent this trouble, the hydraulic servo-cylinder 33 is blocked from its backward movement by turning ON the electromagnetic valve 91 to release the control pressure after the end of the downshift to the second speed so that the change-over valve 83 is actuated to have its first port 85 communicating with the second port 86 thereby to supply the second oil pressure 48, too, with the line pressure.

In short, if the oil pressure is released from the second oil chamber 48 and applied to the first oil chamber 47, the function of the one-way clutch (or brake) is achieved to allow the forward revolutions of the brake drum 20 at the forward third speed but automatically block the backward revolutions of the same accompanying the downshift without switching the oil passage. After the downshift to the second speed, moreover, the oil pressure is supplied to the second oil chamber to release the one-way characteristics.

Next, the case of the upshift to the fourth speed will be described in the following. In the state of the third speed, the electromagnetic valve 91 is OFF, and the change-over valve 83 is supplied with the control pressure so that it is in the lower position, as shown in FIG. 9, to evacuate the second oil chamber 48. If the shift to the fourth speed is judged, the electromagnetic valve 91 is turned ON to release the control pressure. As a result, the change-over valve 83 is switched to take the upper position of FIG. 9 so that the second oil chamber 48 restores the communication with the line pressure oil passage 80. Since, moreover, the line pressure is supplied to the line pressure oil passage 80 from the shift valve or the like so as to set the fourth speed, it is supplied to both the first and second oil chambers 47 and 48. As a result, the hydraulic servo-cylinder 33 cannot be retracted to block the forward revolutions (in the deenergizing direction) of the brake drum 20.

In the case of the downshift from the fourth to third speeds, on the other hand, the electromagnetic valve 91 is held ON to leave the change-over valve 83 as it was before. More specifically, the second oil chamber 48 has communication with the line pressure oil passage 80 via the first and second ports 85 and 86 of the change-over valve 83. If, in this state, the line pressure oil passage 80 is evacuated through the shift valve or the like in accordance with the downshift to the third speed, the oil pressures in the respective oil chambers 47 and 48 are simultaneously released via the line pressure oil passage 80. In this case, the accumulator 82 is actuated to drop the oil pressures in the respective oil chambers 47 and 48 slowly in accordance with the characteristics of the accumulator 82. As a result, the brake drum 20 is slowly released from its brakeage so that the output shaft torque will not abruptly change, thus eliminating any fear of occurrence of the shocks at the shift. After the end of this downshift, moreover, the electromagnetic valve 91 is switched ON to supply the change-over valve 83 with the control pressure. This supply is prepared for the downshift from the third to second speeds.

Thus, the brake system so far described can perform both the function of a brake system having the one-way characteristics and a brake system without such characteristics, so that it can be used not only for braking a two-way rotatable member but also for optimizing the timings of applying and releasing the brakeage to effectively prevent the shocks at the shifts.

Incidentally, the foregoing embodiment has been described in case the brake system of the present invention is used as the second brake B2 of the gear transmission shown in FIG. 8. Despite of this fact, however, the brake system can be used as brake means for a suitable gear transmission other than the second brake B2. In the foregoing embodiment, moreover, the change-over valve is actuated by the control pressure which is supplied and released through the electromagnetic valve. However, the change-over valve to be used may have any construction in which it is electrically switched.

In another embodiment to be described, the supply and release of the oil pressure to and from the aforementioned first and second oil chambers 47 and 48 are controlled to set a predetermined gear ratio.

The brake system shown in FIG. 10 has a hydraulic circuit different from that of the system shown in FIG. 9, as will be described in the following. The line pressure oil passage 80 is connected to a second control pressure port 93 which is opened into the change-over valve 83 in a position arranged with the spring 88. Moreover, the control pressure oil passage 90 connected to the first control pressure port 89 is branched from such a signal pressure oil passage 94 in a position over an orifice 95 and has a function to supply the shift valve (although not shown) or the like with a shift signal pressure for setting the forward second and third speeds, for example. In the control pressure oil passage 90, there is also disposed an electromagnetic valve 96 which is to be turned OFF for closing the oil passage leading to the drain so as to establish the signal pressure at the second and third speeds. This electromagnetic valve 96 is a shift control one used generally in the hydraulic control system of the existing electronic control type automatic transmission.

Next, the operations of the brake system thus constructed will be described in the following.

The second brake B2 of FIG. 8, in which the aforementioned brake system is used, is engaged at the forward second and fourth speeds to set the corresponding speeds, as has been exemplified in Table 3. The operations will be described in the cases of upshifts to those speeds or downshifts from those speeds. Here, at each shift pattern, the states of the electromagnetic valve 96, the port of the change-over valve 83 having communication with the first port 85, and the existence and inexistence of brakeage are exemplified in Table 5.

TABLE 5

|  | EM Valve | Communicating Port | Brakeage |
|---|---|---|---|
| 1st | ON | Line Pressure after Drainage | Backward |
| ↓ | | | |
| 2nd | OFF | Line Pressure | Backward Brakeage |
| 2nd | OFF | Line Pressure | Backward Brakeage |
| ↓ | | | |
| 1st | ON | Line Pressure | Backward |
| 2nd | OFF | Line Pressure | Backward Brakeage |
| ↓ | | | |
| Shift 3rd | OFF | Drainage | Forward |
| Pattern 3rd | OFF | Drainage | Forward |
| ↓ | | | |
| 2nd | ON | Line Pressure | Backward Brakeage |
| 3rd | OFF | Drainage | Forward |
| ↓ | | | |
| 4th | ON | Line Pressure | Forward Brakeage |
| 4th | ON | Line Pressure | Forward Brakeage |
| ↓ | | | |
| 3rd | OFF | Drainage | Forward |

In the case of the upshift from first to second speeds, the electromagnetic valve 96 is turned OFF in accordance with the judgement of the shift so that the shift signal pressure is exerted upon the first control pressure port 89 of the change-over valve 83. As a result, the spool 84 is moved to the left of FIG. 10 (i.e., to the lower position, as shown in FIG. 10) to cause the first port 85 to communicate with the drain port 87. In other words, the second oil chamber 48 is evacuated. Simultaneously with this, the line pressure for setting the second speed is established in the line pressure oil passage 80 as a result of the change-over of the 1-2 shift valve (although not shown), for example, and is supplied to the first oil chamber 47. As a result, the hydraulic servo-cylinder 33 has its piston 37 moved to the right of FIG. 10 so that the brake band 22 is fastened through the push rod 34. In this case, the brake drum 20 is revolving (backward) in the direction, as indicated at letter A, i.e., in the so-called "energizing direction" aligned with the fastening direction by the push rod 34, so that the hydraulic servo-cylinder 33 is moved to the right of FIG. 10 by the frictional force established between the brake drum 20 and the brake band 22. As a result, the the brake band 22 is forcibly wound on the brake drum 20 to brake it by the so-called "winding force" together with the fastening force increased by the push rod 34. In this case, the line pressure is supplied to the first oil chamber 47 through the accumulator 82 so that it slowly rises according to the characteristics of the accumulator 82. This causes no abrupt torque fluctuation in the output member 68 so that the shocks at the speed change can be reduced. If the oil pressure to be supplied to the first oil chamber 47 gradually rises, the oil pressure at the second control pressure port 93 in the change-over valve 83 also gradually rises. When the oil pressure on the second control pressure port 93 and the pushing force by the spring 88 exceed the pushing force by the shift signal pressure on the first control pressure port 89, the spool 84 is moved to the right of FIG. 10 (i.e., to the upper position, as shown in FIG. 10) so that the second oil chamber 48 communicates with the line pressure oil passage 80 and is supplied with the line pressure. After the end of this shift, the backward movement of the hydraulic servo-cylinder 33 is blocked by the oil pressure in the second oil chamber 48 to effect the brakeage by the engine, for example. Even if the brake drum 20 is about to revolve (forward) in the direction, as indicated by letter B in FIG. 10, the hydraulic servo-cylinder 33 is not moved backward to maintain the brakeage of the brake drum 20.

In the case of the downshift from the second to first speeds, on the contrary, the electromagnetic valve 96 is switched from OFF to ON in accordance with the judgement of the shift, and the line pressure is released from the line pressure oil passage 80 by the change-over of the 1-2 shift valve, for example. The change-over valve 83 does not operate any more except the disappearance of the shift signal oil pressure exerted upon the first control pressure port 89 as a result that the electromagnetic valve 96 is turned ON. As a result, the second oil chamber 48 is let in communication with the line pressure oil passage 80 via the first port 85 and the second port 86. As a result, the oil pressures in the respective oil chambers 47 and 48 of the hydraulic servo-cylinder 33 are released via the line pressure oil passage 80, and the pushing force of the push rod 34, i.e., the fastening force of the brake band 22 accordingly disappears. As a result, the brake drum 20 is released from the brakeage so that the brake drum 20 begins to revolve backward to set the first speed. Since the accumulator 82 operates in this case, the oil pressures in the respective oil chambers 47 and 48 slowly drop according to the characteristics of the accumulator 82. As a result, the brake drum 20 is slowly released from the brakeage so that the shocks at the speed change accompanying the downshift from the second to first speeds are reduced.

In the state of the second speed, the electromagnetic valve 96 is turned OFF, as has been described hereinbefore, so that the shift signal pressure is applied to the first control pressure port 89. Since, however, the line pressure for setting the second speed is applied to the second control pressure port 93, the spool 84 is moved to the right of FIG. 10, and the backward revolutions of the brake drum 20 are blocked. Even if the shift to the forward third speed is judged in this state, the electromagnetic valve 96 is left OFF. Since, however, the line pressure oil passage 80 is evacuated by the operation of the 2-3 shift valve (although not shown), for example, the hydraulic pressures in the respective oil chambers 47 and 48 slowly drop according to the characteristics of the accumulator 82. If the pressure at the second control pressure port 93 in the change-over valve 83 drops in accordance with the drop of the oil pressure in the line pressure oil passage 80, the spool 84 is moved to the left of FIG. 10 in response to the shift signal pressure exerted upon the first control pressure port 89 so that the second oil chamber 48 is abruptly evacuated via the first port 85 and the drain port 87. In this state, the push rod 34 is pushed exclusively by the oil pressure in the first oil chamber 47 so that the brake band 22 comes into contact with the brake drum 20. Thus, if the clutch torque at the aforementioned third clutch C3 for setting the third speed reaches the turbine torque, the brake drum 20 begins to revolve forward (or in the deenergizing direction), i.e., in the direction, as indicated at letter B in FIG. 10, so that the hydraulic servo-cylinder 33 is moved backward to the left of FIG. 10 as a result of the evacuation of the second oil chamber 48. When the hydraulic servo-cylinder 33 is moved backward some distance, the aforementioned valve sleeve 40 comes into abutment against the end plate 45 to bring its extension 42 apart from the valve seat 43 forming the front face of the stopper plate 39, and the oil port 50 and the oil passage 54 are misaligned from each other to shut off the first oil chamber 47 from the line pressure oil passage 80 so that the oil pressure is abruptly released from the first oil chamber 47 via the oil passage 41 and the second oil chamber 48. As a result, the pushing force of the push rod 34 disappears to release the brake drum 20 from the brakeage. In the case of the upshift from the second to third speeds, more specifically, the brake drum 20 begins to revolve and releases its brakeage, that is to say, it acts as a one-way clutch. Thus, the engagement of the second clutch C2 and the release of the second brake B2 are completely timed to improve the shocks at the speed change to a remarkably extent.

In the case of the downshift from the forward third to second speeds, too, the electromagnetic valve 96 is maintained in the OFF state. On the other hand, the line pressure oil passage 80 is supplied with the line pressure by the operation of the 2-3 shift valve, for example. In case the shift to the second speed is judged to supply the line pressure oil passage 80 with the line pressure so that the oil pressure in the first oil chamber 47 begins to rise in accordance with the characteristics of the accumulator 82, the brake drum 20 revolves forward until the second clutch C2 is sufficiently released. If, in this state, the frictional force is established between the brake band 22 and the brake drum 20 in accordance with the rise of the oil pressure in the first oil chamber 47, the hydraulic servo-cylinder 33 is moved backward by the turning force of the brake drum 20 so that the valve sleeve 40 comes into abutment against the end plate 45 to open the oil passage 41. Even if, at this instant, the oil pressure were supplied to the first oil chamber 47, the brake band 22 accordingly comes into contact with the brake drum 20 so that the first oil chamber 47 is evacuated, as described above. As a result, the brake band 22 is repeatedly brought into and apart from contact with the brake drum 20 while leaving the brake drum 20 out of brakeage. If the second clutch C2 is gradually released to reduce its clutch torque, the brake drum 20 begins to revolve backward (in the energizing direction), as has been described hereinbefore. At this time, the brake band 22 is in contact with the brake drum 20 so that the hydraulic servo-cylinder 33 is moved to the right of FIG. 10. As a result, the oil passage 41 leading from the first oil chamber 47 to the second oil chamber 48 is closed so that the oil pressure in the first oil chamber 47 abruptly rises to fasten the brake band 22 thereby to brake the brake drum 20. If the oil pressure at the second control pressure port 93 in the change-over valve 83 rises to some level in accordance with the rise of the oil pressure in the first oil chamber 47, the spool 84 is moved to the right of FIG. 10 so that the second oil chamber 48 is caused to communicate with the line pressure oil passage 80 to supply the second oil chamber 48 with the line pressure. In other words, the backward movement of the hydraulic servo-cylinder 33 is blocked together with the forward revolutions of the brake drum 20 so that the braking effect can be attained at the second speed by the engine.

In the case of the upshift from the second to third speeds, the brake drum 20 begins to revolve forward to automatically release the brakeage. In the case of the downshift from the third to second speeds, on the other hand, the brake drum 20 is about to revolve backward to automatically effect the brakeage of the brake drum 20. Thus, the brake drum 20 functions as a one-way clutch (or brake) so that the shocks at the speed change can be reduced reliably and simply. After the downshift to the second speed, moreover, the second oil chamber 48 is supplied with the oil pressure to release the one-way characteristics.

Next, the case of an upshift to the fourth speed will be described in the following. If this upshift is judged in the state of the third speed, the electromagnetic valve 96 is switched ON. Then, the shift signal oil pressure is not applied to the first control pressure port 89 so that the spool 84 of the changeover valve 83 is moved to the right of FIG. 10. On the other hand, the line pressure oil passage 80 is supplied with the line pressure by the operation of the electromagnetic valve (although not shown). As a result, the oil chambers 47 and 48 are slowly supplied with the respective oil pressures in accordance with the characteristics of the accumulator 82. In this case, the brake drum 20 is revolving in the deenergizing direction, but the oil pressure is also supplied to the second oil chamber 48 to block the backward movement of the hydraulic servo-cylinder 33 so that the brake band 22 is slowly fastened to gradually block the forward revolutions of the brake drum 20.

In the case of the downshift from the fourth to third speeds, on the other hand, the electromagnetic valve 96 is switched from ON to OFF in accordance with the judgement of the shift. Since, however, the line pressure is applied to the second control pressure port 93 of the change-over valve 83 so that the spool 84 is held in its righthand pushed position of FIG. 10. As a result, the individual oil chambers 47 and 48 are slowly evacuated via the line pressure oil passage 80. If, on the other hand, the oil pressure at the second control pressure port 93 in the change-over valve 83 drops to some level in accordance with the drop of the oil pressure in the line pressure oil passage 80, the spool 84 is moved to the left of FIG. 10 by the shift signal pressure applied to the first control pressure port 89 so that the first port 85 is caused to communicate with the drain port 87 to abruptly evacuate the second oil chamber 48. Since, in this state, the hydraulic servo-cylinder 33 is loaded in the backward direction by the brake drum 20, the second oil chamber 48 is evacuated to move the hydraulic servo-cylinder 33 backward so that the valve sleeve 40 is relatively pushed like the case of the aforementioned upshift to the third speed to establish the communication of the first oil chamber 47 with the second oil chamber 48. As a result, the first oil chamber 47 is also abruptly evacuated to release the brakeage of the brake drum 20 thereby to allow the same to revolve forward. This means that the third speed is set.

Thus, the brake system thus constructed is enabled to function as both a brake having the one-way characteristics according to the supply of the oil pressure and a brake having no one-way characteristics. As a result, the brake system can be used for braking a member capable of revolving forward and backward and for having its braking and releasing timings optimized to effectively prevent the shocks at the speed change. Moreover, the supply and release of the oil pressure for such operations resort to the shift signal pressure and the line pressure for setting the individual speeds but not any special hydraulic control system and method so that both of these system and method can be simplified.

Incidentally, in the embodiment described above, the shift signal pressure to be applied to another predetermined shift valve is used as that to be applied to the first control pressure port 89 of the change-over valve 83. In the present invention, however, the shift signal pressure may be exemplified by the line pressure to be applied to the hydraulic servo-mechanism of another predetermined frictional engagement system.

In the embodiment described above, the present invention is applied to the so-called "electronic control type automatic transmission", in which the speed changes are accomplished by operating the electromagnetic valve 96. Despite of this fact, however, the brake system of the present invention can also be applied to a hydraulic control type automatic transmission.

Figure 11:
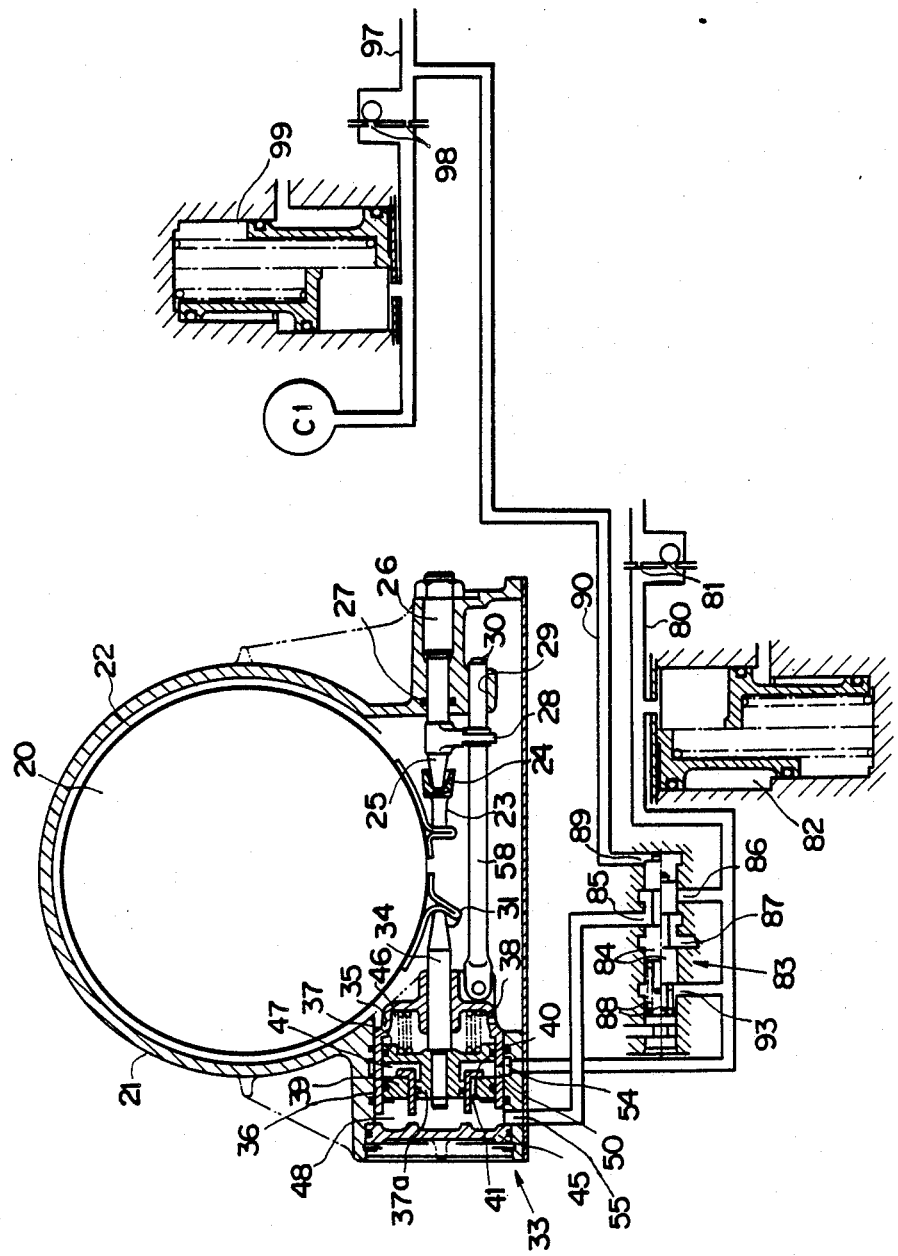
FIG. 11 is a section showing a fifth embodiment of the present invention.

FIG. 11 is a schematic view showing this embodiment, in which the first clutch C1 is identical to the first clutch C1 of FIG. 8 and is engaged according to the foregoing Table 3 except that it is engaged at the forward third speed in place of the second clutch C2. In other words, the first clutch C1 is engaged at each of the first to third speeds and released at the fourth speed and at the reverse. To this first clutch C1, there is connected an oil passage (which may be named the "first clutch oil passage") 97 for supplying the line pressure to effect the engagement of the first clutch C1 from the shift valve (although not shown). In this first clutch oil passage 97, there are disposed an orifice 98 and an accumulator 99 in the recited order. The control pressure oil passage 90 communicating with the first control pressure port 89 of the change-over valve 83 is connected to with the first clutch oil passage 97 upstream of the orifice 98 (i.e., at the opposite side to the accumulator 99 with respect to the orifice 98). In other words, in the embodiment shown in FIG. 11, the shift signal pressure to be applied to the change-over valve 83 is exemplified by the clutch pressure of the clutch to be released at a speed for effecting a forward brakeage (in the deenergizing direction). Therefore, the operations of this embodiment are tabulated in Table 6 in accordance with the foregoing Table 5. In Table 6, the column "signal pressure" indicates whether or not the clutch pressure for the first clutch C1 is established. In this column, "ON" indicates that the clutch pressure is supplied to the first clutch C1 so that a similar pressure is exerted as the shift signal pressure upon the change-over valve 83, and "OFF" indicates that the shift signal pressure is not working.

TABLE 6

| | EM Valve | Communicating Port | Brakeage |
|---|---|---|---|
| 1st | ON | Drainage | Backward |
| ↓ | | | |
| 2nd | ON | Line Pressure | Backward Brakeage |
| 2nd | ON | Line Pressure | Backward Brakeage |
| ↓ | | | |
| 1st | ON | Drainage | Backward |
| 2nd | ON | Line Pressure | Backward Brakeage |
| ↓ | | | |
| Shift 3rd | ON | Drainage | Forward |
| Pattern 3rd | ON | Drainage | Forward |
| ↓ | | | |
| 2nd | ON | Line Pressure | Backward Brakeage |
| 3rd | ON | Drainage | Forward |
| ↓ | | | |
| 4th | OFF | Line Pressure | Forward Brakeage |
| 4th | OFF | Line Pressure | Forward Brakeage |
| ↓ | | | |
| 3rd | ON | Drainage | Forward |

As is apparent from the foregoing description and Table 6, the first clutch C1 is maintained in its engagement at each of the first to third speeds so that the switching operation of the change-over valve 83 is accomplished at a shift between those speeds exclusively by the oil pressure supplied from the line pressure oil passage 80.

In the state of the forward first speed, the line pressure is supplied to the first clutch C1 via the first clutch oil passage 97. The oil pressure is supplied to the first control pressure port 89 of the change-over valve 83 but not to the line pressure oil passage 80. As a result, the spool 84 of the change-over valve 83 is positioned at the lefthand side, as located in the lower portion of FIG. 11, and the individual oil chambers 47 and 48 are evacuated so that the brake band 22 is in its released state. In this state, the brake drum 20 is revolving backward (i.e., in the energizing direction). At the upshift from the first to second speeds, the line pressure is supplied to the line pressure oil passage 80 so that the oil pressure in the first oil chamber 47 is boosted to the line pressure in accordance with the accumulator 82. Consequently, the push rod 34 is moved together with the piston 37 to the right of FIG. 11 to gradually fasten the brake band 22. Since, however, the brake drum 20 is revolving (backward) in the energizing direction, the brake band 22 comes into contact with the brake drum 20 so that it is wound up by the brake drum 20 and forcibly fastened to brake the same. When, on the other hand, the oil pressure in the first oil chamber 47 gradually rises so that the oil pressure at the second control pressure port 93 of the change-over valve 83 accordingly rises to some level, the force to push the spool 84 to the right of FIG. 11 exceeds the pushing force to be exerted upon the first control pressure port 89 by the shift signal pressure. As a result, the spool 84 is moved to the right, as located in the upper portion of FIG. 11, to cause the second oil chamber 48 to communicate with the line pressure oil passage 80, too. After the shift to the second speed, more specifically, the line pressure is supplied to the individual oil chambers 47 and 48 to block the backward movement of the hydraulic servo-cylinder 33 and accordingly the forward revolutions of the brake drum 20, which might otherwise be caused in the braking effect by the engine, for example.

In the case of the downshift from the second to first speeds, the line pressure oil passage 80 is evacuated so that the oil pressures in the respective oil chambers 47 and 48 gradually drop according to the characteristics of the accumulator 82. In accordance with this drop, the piston 37, i.e., the push rod 34 is pushed back by the return spring 38 so that the brake drum 20 is so slowly released from its brakeage as to establish no shock at the speed change. As the oil pressure exerted upon the second control pressure port 93 drops to some level, the spool 84 is moved to the left of FIG. 11 by the shift signal pressure exerted upon the first control pressure port 89 to establish the communication of the second oil chamber 48 with the drain thereby to abruptly evacuate the same chamber 48.

In the case of the upshift from the second to third speeds, the line pressure oil passage 80 is evacuated so that the individual oil chambers 47 and 48 are slowly evacuated according to the characteristics of the accumulator 82. Moreover, since the oil pressure is exerted upon the second control pressure port 93 of the change-over valve 83, the spool 84 is moved to the left of FIG. 11 by the shift signal pressure exerted upon the first control pressure port 89. As a result, the second oil chamber 48 is abruptly evacuated. When the second clutch C2 has its oil pressure raised to have its clutch torque exceeding the turbine torque, the brake drum 20 begins to revolve forward (i.e., in the deenergizing direction). Since the hydraulic servo-cylinder 33 is accordingly loaded to move backward, the second oil chamber 48 is evacuated to move the hydraulic servo-cylinder 33 backward so that the oil passage 41 for establishing the communication between the first and second oil chambers 47 and 48 is opened like the foregoing embodiments to evacuate the first oil chamber 47, too. In other words, the brake drum 20 is about to revolve forward to automatically release the brakeage.

In the case of the downshift from the third to second speeds, on the other hand, the line pressure oil passage 80 is supplied with the line pressure from the shift valve or the like. Since, in this state, the spool 84 is positioned in the lower position, as shown in FIG. 11, to close the second port 86, the first oil chamber 47 is first supplied with the oil pressure. If, in this state, the brake drum 20 is revolving forward, the hydraulic servo-cylinder 33 is retracted by the force of the brake drum 20 so that the first oil chamber 47 is also evacuated to effect no brakeage, as has been described hereinbefore. If, moreover, the clutch pressure of the second clutch C2 drops to allow the brake drum 20 to revolve backward, the brake band 22 is about to be wound up by the brake drum 20, and the hydraulic servo-cylinder 33 is moved forward to leave the valve mechanism 41 closed so that the oil pressure in the first oil chamber 47 is abruptly boosted to block the backward revolutions of the brake drum 20. In the case of the downshift to the second speed, more specifically, the brakeage of the brake drum 20 is automatically established by the backward revolutions of the brake drum 20 itself. If, moreover, the oil pressure in the second control pressure port 93 of the change-over valve 83 rises to some level in accordance with the rise of the oil pressure in the first oil chamber 47, the spool 84 is moved to the right of FIG. 11 to cause the second oil chamber 48 to communicate with the line pressure oil passage 80, too. After the downshift to the second speed, therefore, the line pressure is supplied to the individual oil chambers 47 and 48 to effect the brakeage thereby to block the forward revolutions of the brake drum 20, which might otherwise be caused by the braking effect on the engine.

In the case of the upshift from the third to fourth speeds, the first clutch C1 is released, and the second brake B2 is engaged (with the one-way clutch F2 being engaged although the first clutch C1 is released) to evacuate the control pressure oil passage 90 and to supply the line pressure oil passage 80 with the line pressure. Then, the change-over valve 83 has its first control pressure port 89 receiving no oil pressure to move its spool 84 to the right of FIG. 11 so that the second oil chamber 48 communicates with the line pressure oil passage 80 via the first and second ports 85 and 86. As a result, the line pressure for setting the fourth speed is supplied simultaneously to the individual oil chambers 47 and 48 to block the forward revolutions of the brake drum 20. In this case, these oil chambers 47 and 48 are supplied with the oil pressure slowly in accordance with the characteristics of the accumulator 82, and the one-way clutch F2 is naturally released so that no abrupt brakeage is caused to reduce the shocks at the speed change.

In the case of the downshift from the fourth to third speeds, on the contrary, the line pressure is applied to the first clutch C1 and exerted upon the first control pressure port 89 of the change-over valve 83 to evacuate the line pressure oil passage 80. Thus, immediately after the judgement of the speed change, the intensive force for moving the spool 84 to the right of FIG. 11 causes the individual oil chambers 47 and 48 to communicate with the line pressure oil passage 80 so that the oil chambers 47 and 48 are slowly evacuated. When the oil pressure exerted upon the second control pressure port 93 of the change-over valve 83 drops to some level, the spool 84 is moved to the left of FIG. 11 by the oil pressure exerted upon the first control pressure port 89 so that the second oil chamber 48 is abruptly evacuated through the drain. Since, in this state, there is no action to block the backward movement of the hydraulic servo-cylinder 33, this servo-cylinder 33 is moved backward according to the forward revolutions of the brake drum 20. As a result, the valve mechanism 44 is opened to evacuate the first oil chamber, too, thereby to release the brake drum 20 from its brakeage, as has been described hereinbefore.

Thus, the brake system of the present invention can act, without any electrical means, as either a brake having the one-way characteristics in accordance with each speed or a brake having none of the one-way characteristics so that it can reduce the shocks at the speed change with the simple structure.

Here, the foregoing individual embodiments are made such that they have to accomplish the brakeage at a plurality of speeds. Let another construction be considered, in which the brakeage is accomplished only at one predetermined speed of a drive (D) range, for example, in case the gear ratios are reduced to forward three and one reverse. In this case, the shift signal pressure to be used for the change-over valve 83 can be exemplified by the line pressure which is applied and released through the manual valve used in the existing automatic transmission.

Incidentally, those brake systems exhibit the one-way characteristics to effect the brakeage not in the denergizing direction but in the energizing direction if the first oil chamber 47 is supplied with the oil pressure where as the second oil chamber 48 is evacuated. In case, however, a predetermined gear ratio is set by supplying the first oil chamber 47 with the line pressure while causing the second oil chamber 48 to communicate with the drain to block the revolutions of the brake drum 20 in the energizing direction, the torque in the deenergizing direction is applied to the brake drum 20 if the automobile is braked by the engine at that gear ratio. Then, the servo-cylinder 33 is moved backward to cause the opening operation of the valve mechanism 44, as has been described hereinbefore. As a result, the brake drum 20 revolves to make the brakeage ineffective, and the line pressure is released through the first oil chamber 47 and the second oil chamber 48. It is, therefore, necessary to supply the second oil chamber 48 to eliminate the one-way characteristics after the end of the shift in the case of the gear ratio at which the revolutions of the brake drum 20 in the energizing direction are blocked in the state of supplying the oil pressure exhibiting the one-way characteristics.

This supply of the oil pressure to the second oil chamber 48 for eliminating the one-way characteristics is desired to occur after the end of the shift having substantially blocked the revolutions of the brake drum 20. For this desire, either the r.p.m. of the rotatable member such as a gear forming part of the automatic transmission or the oil pressure in a predetermined oil passage could be detected to judge the end of the shift so that the electromagnetic valve or the like might be actuated in accordance with the result of judgement to open the oil passage leading to the second oil chamber 48. This structure would increase the number of components such as the detector and the electromagnetic valve, and this increase is contrary to simplification of the construction which is obtained by adding the one-way characteristics to the brake system.

It is, therefore, conceivable to eliminate the one-way characteristics by causing the change-over valve to open the oil passage for supplying the second oil chamber 48 with the line pressure in accordance with the rise of the oil pressure in the first oil chamber so that the oil pressure may be supplied to the second oil chamber 48 at the instant when the brakeage is substantially completed. With this construction, however, the force to push the push rod 34 is highly different between the cases in which the oil pressure is supplied to the first oil chamber 47 and the second oil chamber 48, and the resultant shocks at the shift have to be prevented, because the piston 37 is formed at its back face with the guide stem 37a projecting into the second oil chamber 48. More specifically, the piston pushing force is expressed by the following equation in case the first oil chamber 47 is supplied with the oil pressure Pb:

$$(\pi/4)\times(D_2^2-D_3^2)\times Pb - F,$$

wherein:

$D_2$: the diameter of the piston;

$D_3$: the diameter of the stem 37a; and

F: the elastic force of the return spring 38.

On the contrary, the piston pushing force is expressed by the following equation in case the second oil chamber 48 is supplied with the oil pressure Pb, $$(\pi/4)\times D_2^2 \times Pb - F.$$

Figure 20:
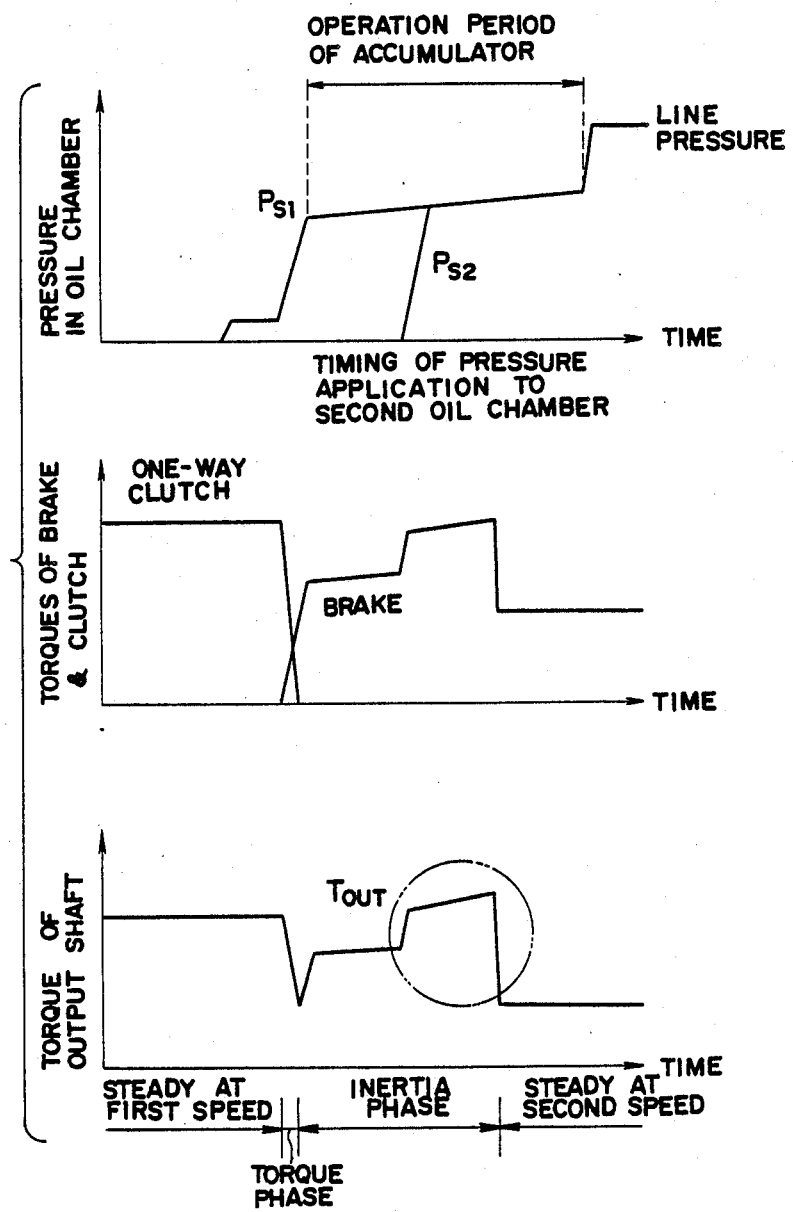
FIG. 20 diagrams illustrating the changes of the pressures in the oil chambers, the brake torques and the output shaft torques with time when speed changing shocks are caused due to improper timing of supplying the oil pressure.

Thus, the piston pushing forces in the two cases are greatly different. If the supply of the oil pressure to the second oil chamber 48 takes place in an inertia phase in the shifting transient state, for example, the shocks at the shift are amplified by the abrupt increase in the brake torque. This situation is illustrated in FIG. 20. If the second oil chamber 48 is supplied with the oil pressure to have its pressure $P_{S2}$ raised in the course of the inertia phase in which the accumulator is being actuated to slowly raise the oil pressure $P_{S1}$ of the first oil chamber 47 while slipping the brake, the brake torque is abruptly augmented because of the large pressure receiving area. As a result, the output shaft torque is abruptly augmented to cause the shift shocks, as enclosed by a chain curve in FIG. 20. In case, therefore, the oil pressure to be supplied to the first oil chamber 47 is used as the control pressure of the change-over valve for the second oil chamber 48, some device is required for adjusting the timing.

Figure 12:
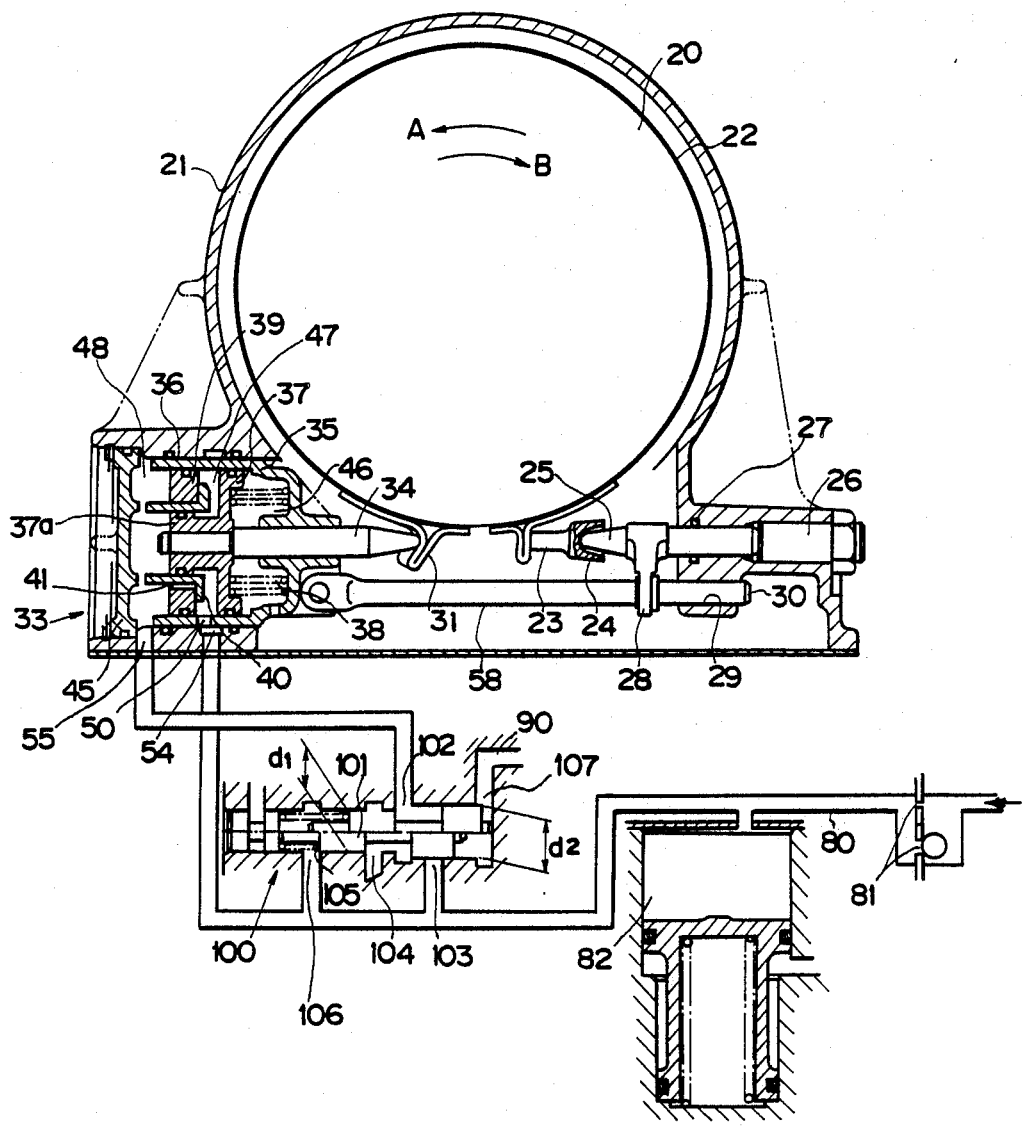
FIG. 12 is a section showing a sixth embodiment of the present invention.

The brake system shown in FIG. 12 is improved such that the supply of the oil pressure to the second oil chamber 48 is substantially timed with the end of the shift by interrupting the revolutions of the brake drum 20 so that the shift shocks may be prevented from being deteriorated.

In the brake system shown in FIG. 12, too, the area of the piston 37 receiving the oil pressure supplied to the first oil chamber 47 is expressed by the following equation because the piston 37 is formed with the aforementioned stem 37a:

$$(\pi/4)\times(D_2^2-D_3^2).$$

As a result that both the first and second oil chambers 47 and 48 are supplied with the oil pressure, the area of the piston 37 receiving the pressure is expressed by the following equation:

$$(\pi/4)\times D_2^2.$$

Hence, the pressure receiving area for pushing the piston 37 is larger in case the oil pressure is exerted upon the first oil chamber 47 only than in case the oil pressure is exerted upon both the first and second oil chambers 47 and 48.

Moreover, a change-over valve (e.g., a brake servo-sequence valve) 100 for controlling the supply and release of the oil pressure to and from the second oil chamber 48 is constructed in the following manner. In this change-over valve 100, a spool 101 having two lands is moved to switch the communication of a first port 102 leading to the second oil chamber 48 selectively with either a second port 103 leading to the line pressure oil passage 80 or a drain port 104. The spool 101 is arranged at its one end with a spring 105 for pushing the spool 101 and formed with a second control pressure port 106 in the portion accommodating the spring 105. The aforementioned line pressure oil passage 80 is branched and connected to the second control pressure port 106. To a first control pressure port 107 formed at the side opposite to the spring 105, there is connected the control pressure oil passage 90 for feeding the first control pressure port 107 with the shift signal pressure which is established at the forward second and third speeds, for example.

Incidentally, of the faces of the aforementioned spool 101, the face for receiving the oil pressure from the second control pressure port 106 has a smaller diameter d1 than the diameter d2 of the face for receiving the oil pressure to be applied to the first control pressure port 107. This size difference is made according to the elastic force of the aforementioned spring 105 so that the spool 101 may be moved to the first control pressure port 107 with the shift signal pressure being exerted upon the first control port 107, when the oil pressure applied to the second control pressure port 106 is boosted to a level substantially equal to that at the first control pressure port 107. The remaining construction is similar to that of the structures shown in FIGS. 6 to 11.

Next, the operations of the brake system constructed above will be described in the following.

The second brake B2 of FIG. 8 using the aforementioned brake system is engaged at the forward second and fourth speeds, as enumerated in Table 3, to set the respective speeds. The operations for the upshifts and downshifts to and from those speeds will be described in the following. Incidentally, the presence and absence of the shift signal pressure to be applied to the first control pressure port 107 for each shift pattern and the port having communication with the first port 102 of the change-over valve 100 and the brakeage are enumerated in Table 7:

TABLE 7

|  | Signal Pr. | Communicating Port | Brakeage |
| --- | --- | --- | --- |
| 1st | OFF | Line Pressure after Drainage | Backward |
| ↓ |  |  |  |
| 2nd | ON | Line Pressure | Backward Brakeage |
| 2nd | ON | Line Pressure | Backward Brakeage |
| ↓ |  |  |  |
| 1st | OFF | Line Pressure | Backward |
| 2nd | ON | Line Pressure | Backward Brakeage |
| ↓ |  |  |  |
| Shift 3rd | ON | Drainage | Forward |
| Pattern 3rd | ON | Drainage | Forward |
| ↓ |  |  |  |
| 2nd | ON | Line Pressure | Backward Brakeage |
| 3rd | ON | Drainage | Forward |
| ↓ |  |  |  |
| 4th | OFF | Line Pressure | Forward Brakeage |
| 4th | OFF | Line Pressure | Forward Brakeage |
| ↓ |  |  |  |
| 3rd | ON | Drainage | Forward |

In the case of the upshift from the first to second speeds, the shift signal pressure is established in the control pressure oil passage 90 and exerted upon the first control pressure port 107 of the change-over valve 100. As a result, the spool 101 is moved to the left of FIG. 12 (i.e., the lower position of FIG. 12) to have the first port 102 communicating with the drain port 104. In other words, the second oil chamber 48 is evacuated. Simultaneously with this, the line pressure for setting the second speed is established in the line pressure oil passage 80 as a result of the change-over of the 1-2 shift valve (although not shown), for example, and is supplied to the first oil chamber 47. As a result, in the hydraulic servo-cylinder 33, the piston 37 is moved to the right of FIG. 12 to fasten the brake band 22 through the push rod 34. In this case, the brake drum 20 is revolving (backward) in the direction, as indicated by the letter A, i.e., in the so-called "energizing direction" aligned with the fastening direction by the push rod 34 so that the hydraulic servocylinder 33 is moved to the right of FIG. 12 by the frictional force established between the brake drum 20 and the brake band 22. Thus, the brake band 22 is forcibly wound to brake the brake drum 20 by the so-called "winding force" of the brake drum 20 as well as the increased fastening force by the push rod 34. In this case, the line pressure is supplied to the first oil chamber 47 through the accumulator 82 so that it slowly rises according to the characteristics of the accumulator 82. As the oil pressure to be supplied to the first oil chamber 47 gradually rises, the oil pressure at the second control pressure port 106 of the change-over valve 100 also gradually rises. Since, however, the diameter d1 of the face at the side of the second control pressure port 106 is set at the smaller value, the spool 101 is left while being pushed to the left of FIG. 12 by the shift signal pressure (i.e., the line pressure) exerted upon the first control pressure port 107 until the pressure exerted upon the second control pressure port 106 rises to some level. If, moreover, the pressure at the second control pressure port 106 is boosted together with the pressure in the first oil chamber 47 to a level substantially equal to that of the shift signal pressure exerted upon the first control pressure pot 107, the force (i.e., the sum of the oil pressure and the spring force) for pushing the spool 101 to the first control pressure port 107 overcomes its opposite force so that the spool 101 is moved to the right, as located in the upper portion of FIG. 12. As a result, the first port 102 communicates with the second port 103 so that the line pressure is supplied to the second oil chamber 48. As a result, the backward movement of the hydraulic servo cylinder 33 is blocked by the oil pressure in the second oil chamber 48 so that it is not moved backward to maintain the brake drum 20 in the braked state even if the brake drum 20 is about to revolve (forward) in the direction, as indicated by letter B in FIG. 12, in the state braked by the engine, for example.

The change in the oil pressures $P_{S1}$ and $P_{S2}$ in the individual oil chambers 47 and 48, the brake torques and the output shaft torque with time in the shifting procedures described above are illustrated in FIG. 13. As the oil pressure $P_{S1}$ in the first oil chamber 47 begins to rise, the brake torque also rises. After the start of the operations of the accumulator 82, however, the rise of the oil pressure in the first oil chamber 47 becomes gentle so that the rise of the brake torque also becomes gentle. As a result, no large change appears in the output shaft torque. Immediately before the end of the operations of the accumulator 82, the influence of the inertia disappears to substantially interrupt the brake drum 20 so that the brake torque and the output shaft torque accordingly drop to some extent. The shift to the second speed is completed on and before the instant when the operations of the accumulator 82 disappear. At this instant, the change-over valve 100 is switched, as has been described hereinbefore, to supply the second oil chamber 48 with the line pressure as a result that the oil pressure in the first oil chamber 47 rises according to the end of the operations of the accumulator 82. In case, moreover, the hydraulic pressure is applied to both the first and second oil chambers 47 and 48, the brake drum 20 is braked by the high fastening force resulting from the large pressure receiving area. Thus, the increase in the braking force accompanying the supply of the line pressure to the second oil chamber 48 takes place after the stop of the brake drum and accordingly after the end of the shift (i.e., after the inertia phase and the steady state at the second speed) so that the abrupt increase in the braking force will not adversely affect the shift shocks.

In the case of the downshift from the second to first speeds, on the contrary, the shift signal pressure is released from the control pressure oil passage 90, and the line pressure is released from the line pressure oil passage 80 as a result of the change-over of the 1-2 shift valve, for example. The change-over valve 100 is kept away of any operation except the action of the shift signal pressure exerted upon the first control pressure port 107, because its spool 101 is pushed to the right of FIG. 12. Then, the second oil chamber 48 is left in communication with the line pressure oil passage 80 through the first and second ports 102 and 103. As a result, the oil pressures in the respective oil chambers 47 and 48 of the hydraulic servo-cylinder 33 are released via the line pressure oil passage 80, and the pushing force of the push rod 34, i.e., the fastening force of the brake band 22 accordingly disappear. Then, the brake drum 20 is released from its brakeage and begins to revolve backward to set the first speed. Since the accumulator 82 is operating in this case, the oil pressures in the respective oil chambers 47 and 48 slowly drop according to the characteristics of the accumulator 82. As a result, the release of the brake drum 20 from brakeage is slowly accomplished so that the shocks at the downshift from the second to first speeds are reduced.

In the state of the second speed, as has been described above, the shift signal pressure is applied to the first control pressure port 107, but the line pressure for setting the second speed is also applied to the second control pressure port 106. As a result, the spool 101 is moved to the right of FIG. 12, and the brake drum 20 is blocked from its backward revolutions. If, in this state, the upshift to the forward third speed is caused, the 2-3 shift valve (although not shown), for example, operates to evacuate the line pressure oil passage 80 while the first control pressure port 107 being supplied with the shift signal pressure. As a result, the oil pressures in the respective oil chambers 47 and 48 slowly drop according to the characteristics of the accumulator 82. Instantly when the pressure at the second control pressure port 106 of the change-over valve 100 slightly drops according to the drop of the oil pressure in the line pressure oil passage 80, the spool 101 is moved to the left of FIG. 12 in response to the shift signal pressure applied to the first control pressure port 107, because of the difference in the face areas of the spool 101, as has been described hereinbefore. As a result, the second oil chamber 48 is abruptly evacuated via the first port 102 and the drain port 104. In this state, only the oil pressure in the first oil chamber 47 pushes the push rod 34 to bring the brake band 22 into contact with the brake drum 20. When the clutch torque of the foregiong third clutch C3 for setting the third speed reaches the turbine torque, the brake drum 20 begins to revolve forward (i.e., in the deenergizing direction), as indicated by the letter B in FIG. 12, so that the hydraulic servo-cylinder 33 is moved backward, i.e., to the left of FIG. 12 because the second oil chamber 48 is evacuated. When the hydraulic servo-cylinder 33 retracts some distance, the aforementioned valve sleeve 40 comes into abutment against the end plate 45 to bring its extension 42 apart from the valve seat 43 forming the front face of the stopper plate 39, and the oil port 50 and the oil passage 54 are misaligned to shut off the first oil chamber 47 from the line pressure oil passage 80, so that the oil pressure in the first oil chamber 47 is abruptly released via the oil passage 41 and the second oil chamber 48. As a result, the pushing force of the push rod 34 disappears to release the brake drum 20 from the brakeage. In other words, the brake drum 20 begins to revolve and is released from its brakeage in the case of the upshift from the second to third speeds, that is to say, the brake drum 20 acts as a one-way clutch. As a result, the engagement of the second clutch C2 and the release of the second brake B2 are completely timed to improve the shift shocks remarkably.

In the case of the downshift from the forward third to second speeds, too, the shift signal pressure remains supplied to the first control pressure port 107. Moreover, the line pressure oil passage 80 is supplied with the line pressure as a result of the operation of the 2-3 shift valve, for example. In case the line pressure is supplied to the line pressure oil passage 80 so as to effect the downshift to the second speed so that the oil pressure in the first oil chamber 47 rises according to the characteristics of the accumulator 82, the brake drum 20 is revolving forward until the second clutch C2 is sufficiently released. If, in this state, the frictional force is established between the brake band 22 and the brake drum 20 as a result of the increase of the oil pressure in the first oil chamber 47, the hydraulic servo-cylinder 33 is moved backward by the turning force of the brake drum 20 so that the valve sleeve 40 comes into abutment against the end plate 45 to open the oil passage 41. At this instant, therefore, even if the oil pressure is supplied to the first oil chamber 47, the brake band 22 accordingly comes into contact with the brake drum 20 so that the first oil chamber 47 is evacuated, as described above. As a result, the brake band 22 is repeatedly brought into and out of contact with the brake drum 20 while leaving the brake drum 20 out of the brakeage. When the second clutch C2 is gradually released to reduce its clutch torque, the brake drum 20 begins to revolve backward (i.e., in the energizing direction), as has been described hereinbefore. At this time, the brake band 22 is in contact with the brake drum 20 to move the hydraulic servo-cylinder 33 to the right of FIG. 12. As a result, the oil passage 41 leading from the first oil chamber 47 to the second oil chamber 48 is closed so that the oil pressure in the first oil chamber 47 abruptly rises to fasten the brake band 22 thereby to brake the brake drum 20. When the oil pressure at the second control pressure port 106 of the change-over valve 100 rises to some level as the oil pressure in the first oil chamber 47 rises, the spool 101 is moved to the right of FIG. 12 so that the second oil chamber 48 communicates with the line pressure oil passage 80 to receive the line pressure. Then, the backward movement of the hydraulic servo-cylinder 33 and accordingly the forward revolutions of the brake drum 32 are blocked so that the braking effect by the engine can be achieved at the second speed. In this case, too, the timing, the movement of the spool 101 of the change-over valve 100 from the left to right of FIG. 12 takes place after the end to the second speed because the spool 101 have the different face areas, as has been described hereinbefore. This eliminates the deterioration of the shift shocks, which might otherwise be caused as a result of the increase in the fastening force of the brake band accompanying the supply of the line pressure to the second oil chamber 48 having the larger pressure receiving area.

In the case of the upshift from the second to third speeds, the brake drum 20 begins to revolve forward to release the brakeage automatically. In the case of the downshift from the third to second speeds, on the contrary, the brake drum 20 is about to revolve backward to effect its brakeage automatically. Thus, the brake drum 20 functions as a one-way clutch (or brake) so that it can reduce the shift shocks reliably and simply. After the downshift to the second speed, the oil pressure is supplied to the second oil chamber 48 to release the one-way characteristics.

Next, the upshift to the fourth speed will be described in the following. In this case, in accordance with the judgement of the upshift, the shift signal pressure is not applied to the first control pressure port 107, and the line pressure is supplied to the line pressure oil passage 80 by the operation of the electromagnetic valve (although not shown). As a result, the spool 101 of the change-over valve 100 is positioned at the righthand side, as shown in the upper portion of FIG. 12, so that the respective oil chambers 47 and 48 are slowly supplied with the oil pressures in accordance with the characteristics of the accumulator 82. In this case, the brake drum 20 is revolving in the deenergizing direction, but the oil pressure is also supplied to the second oil chamber 48 so that the brake band 22 is slowly fastened to gradually block the forward revolutions of the brake drum 20.

In the case of the downshift from the fourth to third speeds, on the other hand, the shift signal pressure is applied to the first control pressure port 107, but the line pressure is applied to the second control pressure port 106 of the change-over valve 100 so that the spool 101 is held under pressure in the righthand position of FIG. 12. As a result, the individual oil chambers 47 and 48 are slowly evacuated via the line pressure oil passage 80. When the oil pressure at the second control pressure port 106 of the change-over valve 100 drops to some level as the oil pressure in the line pressure oil passage 80 drops, the spool 101 is moved to the left of FIG. 12 by the shift signal pressure exerted upon the first control pressure port 107 so that the first port 102 communicates with the drain port 104 to abruptly evacuate the second oil chamber 48. Since, in this state, the hydraulic servocylinder 33 is loaded in the backward moving direction by the brake drum 20, it is moved backward as a result of the evacuation of the second oil chamber 48 so that the valve sleeve 40 is relatively pushed to establish the communication of the first oil chamber 47 with the second oil chamber 48 like the aforementioned case of the upshift to the third speed. As a result, the first oil chamber 47 is also abruptly evacuated to release the brake drum 20 so that the brake drum 20 is allowed to revolve forward to set the third speed.

Thus, the brake system described above is enabled to function as both the brake having the one-way characteristics according to the supply of the oil pressure and the brake having none of the one-way characteristics. As a result, the brake system can be used for braking a member capable of revolving forward and backward and can time the brakeage and release properly to effectively prevent the shift shocks. In case, moreover, the line pressure is supplied to the second oil chamber 48 so as to eliminate the one-way characteristics, the fastening force of the brake band is abruptly increased because of the larger pressure receiving area of the second oil chamber 48. This timing occurs at the instant when the pressure applied to the second control pressure port 106 of the change-over valve 100 becomes substantially equal to the pressure applied to the first control pressure port 107 and after the shift has been ended. As a result, the shift shocks are not adversely affected. Still moreover, the supply and release of the oil pressure for the afore-mentioned operations resort to the shift signal pressure and the line pressure for setting the individual gear ratios so that neither any special hydraulic control system nor method are required but can be simplified.

In the embodiment described above, the pressure receiving areas (i.e., the diameters d1 and d2) of the respective faces of the spool 101 are made different to equalize the pressure exerted upon the second control pressure port 106 of the change-over valve 100 substantially to the pressure exerted upon the first control pressure port 107 so that the spool 101 may be moved against the pressure exerted upon the first control pressure port 107. Despite of this fact, however, the present invention should not be limited to the embodiment but is sufficient if the change-over valve accomplishes its switching operation in case the oil pressure supplied to the first oil chamber 47 is boosted to a level substantially equal to the oil pressure exerted upon the first control pressure port 107. Thus, the elastic force of the spring for pushing the spool 101 to the first control pressure port 107 may be weakened to a remarkably low level.

Figure 14:
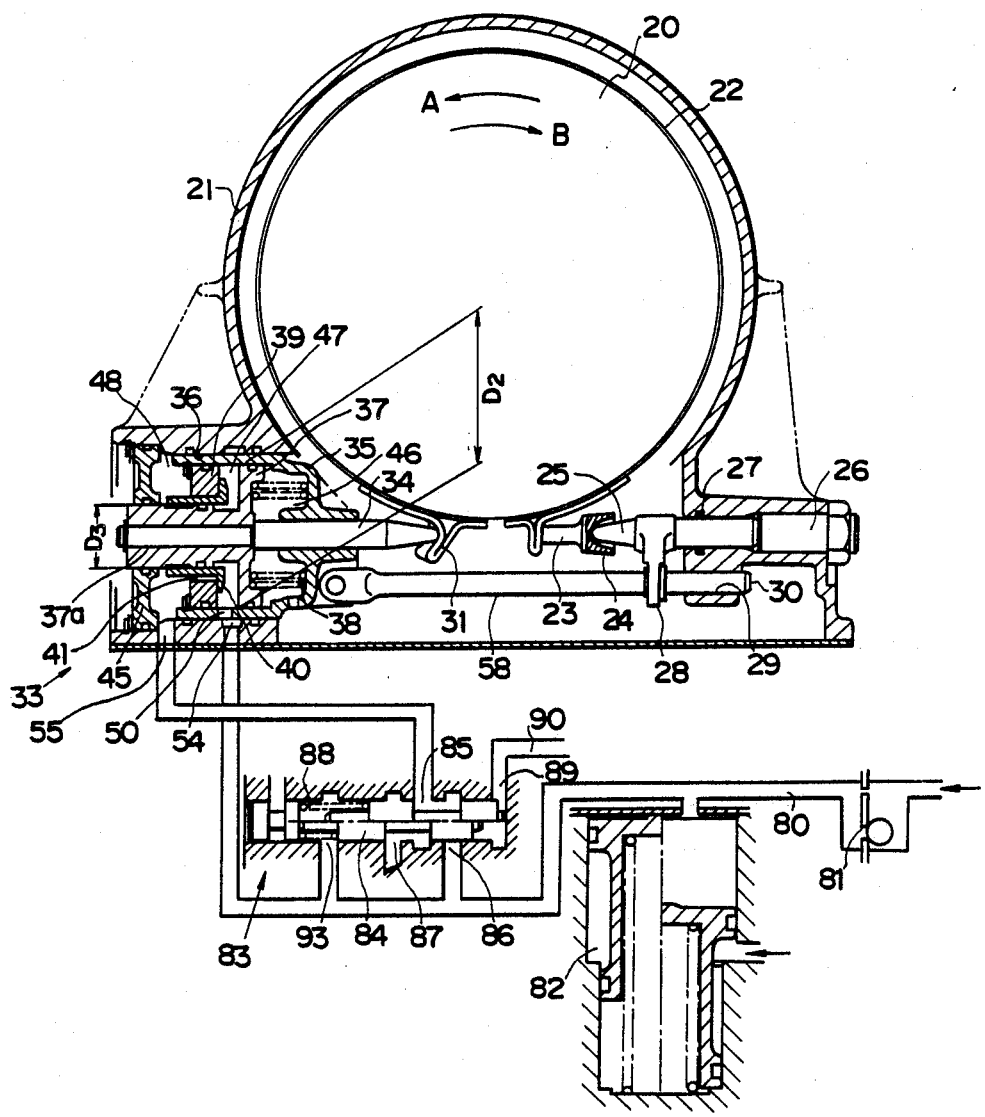
FIG. 14 is a section showing a seventh embodiment of the present invention.

Another embodiment for preventing the shift shocks in case the oil pressure is supplied to the second oil chamber 48 so as to eliminate the one-way characteristics is shown in FIG. 14. The brake system shown in FIG. 14 is improved over the system shown in FIG. 10. The stem 37a of the piston 37 is made longer than that of the structure shown in FIG. 10 to extend to the outside through the second oil chamber 48 and the end plate 45 and is fitted movably back and forth while maintaining the liquid tight with respect to the end plate 45. As a result, the stem 37a and the end plate 45 provide together a guide for guiding the piston 37 back and forth.

In the structure shown in FIG. 14, therefore, the stem 37a extends through both the first oil chamber 47 and the second oil chamber 48 so that the pressure receiving area of the piston 37 receiving the oil pressure supplied from the first oil chamber 47 is substantially equal to that of the piston 37, in case the oil pressures are supplied to both the first and second oil chambers 47 and 48, and takes a value expressed by the following equation:

$$(\pi/4) \times (D_2^2 - D_3^2).$$

Figure 10:
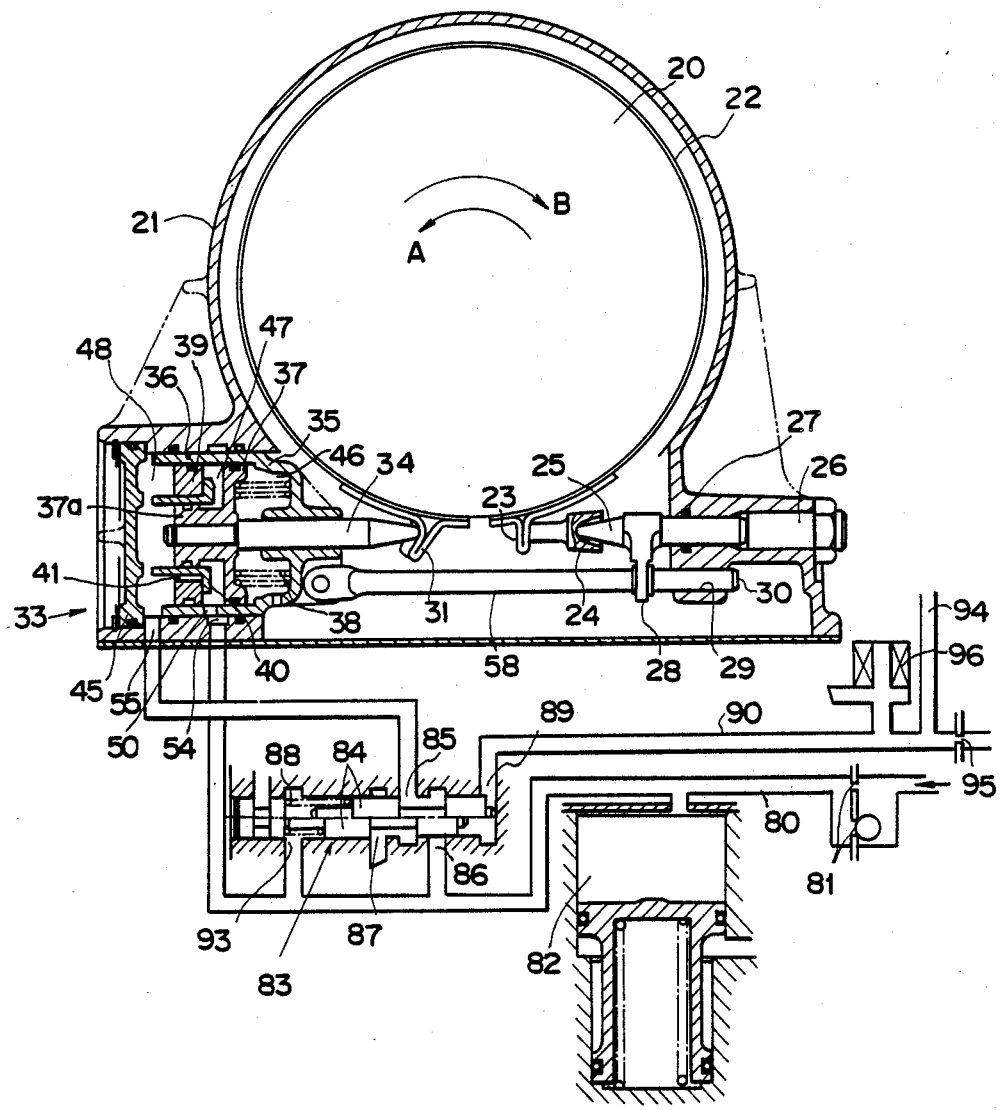
FIG. 10 is a section showing a fourth embodiment of the present invention.

The remaining structure is similar to that shown in FIG. 10, and its description will be omitted by designating its components of FIG. 14 at the common reference numerals shared with those of FIG. 10.

Therefore, the brake system shown in FIG. 14 will operate like the system which has been described with reference to the Table 5. Especially in the aforementioned brake system, the shift shocks are not deteriorated even if the oil pressure is supplied to the second oil chamber 48 so as to eliminate the one-way characteristics after the upshift from the first to second speeds. In the case of this upshift, more specifically, the line pressure is supplied to the first oil chamber 47 to fasten the brake band 22 through the push rod 34. In this case, the brake drum 20 is revolving (backward) in the direction indicated at letter A, and this revolving direction is the so-called "energizing direction" aligned with the fastening direction by the push rod 34. The frictional force is established between the brake drum 20 and the brake band 22 so that the hydraulic servo-cylinder 33 is moved to the right of FIG. 14. As a result, the brake band 22 is forcibly wound to brake the brake drum 20 by the increased fastening force by the push rod 34 as well as the so-called "winding force" of the brake is supplied to the first oil chamber 47 through the accumulator 82, it slowly rises according to the characteristics of the accumulator 82. When, moreover, the oil pressure to be supplied to the first oil chamber 47 gradually rises so that the oil pressure upon the second control pressure port 93 and the pushing force of the spring 88 exceed the pushing force exerted upon the first control pressure port 89 by the shift signal pressure, the spool 84 is moved to the right of FIG. 14 (i.e., to the upper position of FIG. 14) so that the second oil chamber 48 communicates with the line pressure oil passage 80 to supply the second oil chamber 48 with the line pressure, too. After the end of the shift, the backward movement of the hydraulic servocylinder 33 is blocked by the oil pressure in the second oil chamber 48. Even if the brake drum 20 is about to revolve (forward) in the direction, as indicated at letter B in FIG. 14, while the automobile is being braked by the engine, the hydraulic servocylinder 35 is not moved backward to maintain the brake drum 20 in the braked state.

Figure 13:
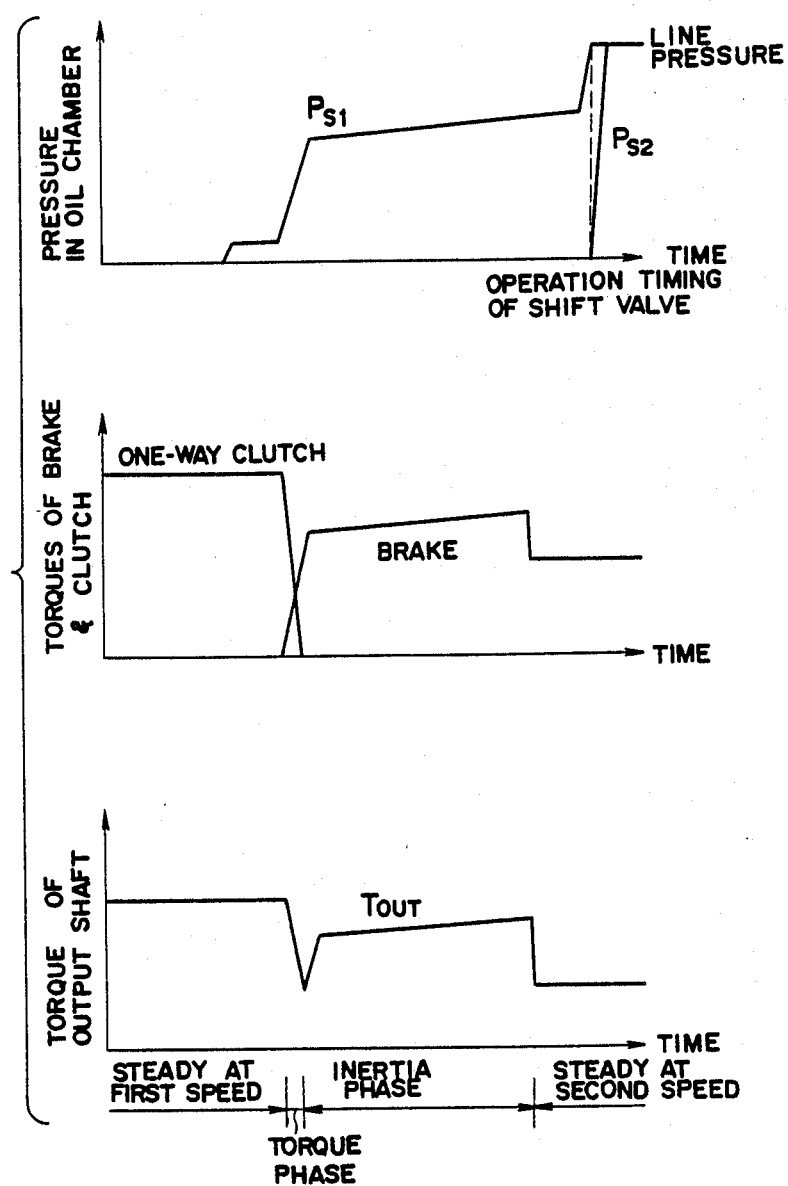
FIG. 13 presents diagrams illustrating the changes of the pressures in the oil chambers, the braking torques and the output shaft torques with time when a shift-up from forward first to second speeds is effected by the use of the brake system shown in FIG. 12.

The time changes in the oil pressures $P_{S1}$ and $P_{S2}$ of the respective oil chambers 47 and 48, the brake torques and the output shaft torques in the shifting procedures described above are similar to the aforementioned ones illustrated in FIG. 13. When the oil pressure $P_{S1}$ in the first oil chamber 47 rises, the brake torque also rises. After the operations of the accumulator have started, the rise of the oil pressure in the first oil chamber 47 becomes gentle together with the rise of the brake torque so that no large change is caused in the output shaft torque. In accordance with the rise of the oil pressure $P_{S1}$ in the first oil chamber 47, i.e., the rise of the oil pressure in the second control pressure port 93 of the change-over valve 83, this valve 83 performs a switching operation during th shift and then the oil pressure is supplied to the second oil chamber 48, too. Since the stem 37a of the piston 37 extends through the individual oil chambers 47 and 48, as has been described hereinbefore, the pressure receiving areas of the piston 37 for receiving the oil pressures are not especially increased, even after the oil pressure is supplied to the second oil chamber 48, so that the brake torque is not highly varied but slowly increased. In other words, the beginning of the supply of the oil pressure to the second oil chamber 48 will not fluctuate the output shaft torque so that the shift shocks are improved.

In the brake system, as has been described herein before, even if the line pressure is supplied to the second oil chamber 48 so as to eliminate the one-way characteristics, the pressure receiving areas of the piston 37 will not become so large as those obtained in case the oil pressure is supplied to the first oil chamber 47. As a result, the fastening force of the brake band 22 is not drastically augmented so that the shift shocks are not deteriorated even if the oil pressure is supplied to the second oil chamber 48 in the course of the shift (i.e., in the inertia phase). In the aforementioned structure, the supply timing of the oil pressure to the second chamber 48 is not especially restricted to simplify the hydraulic control system and the supply timing of the oil pressure. Since, moreover, the tension to be applied to the brake band 22 is not especially enlarged even if the oil pressure is supplied to the second oil chamber 48, the durability of the brake band 22 can be maintained at a satisfactory level. Still moreover, the stem 37a of the piston 37 of the structure shown in FIG. 14 is long enough to widen the sliding guide face of the valve sleeve 40 so that the valve sleeve 37 smoothly moves.

Figure 15:
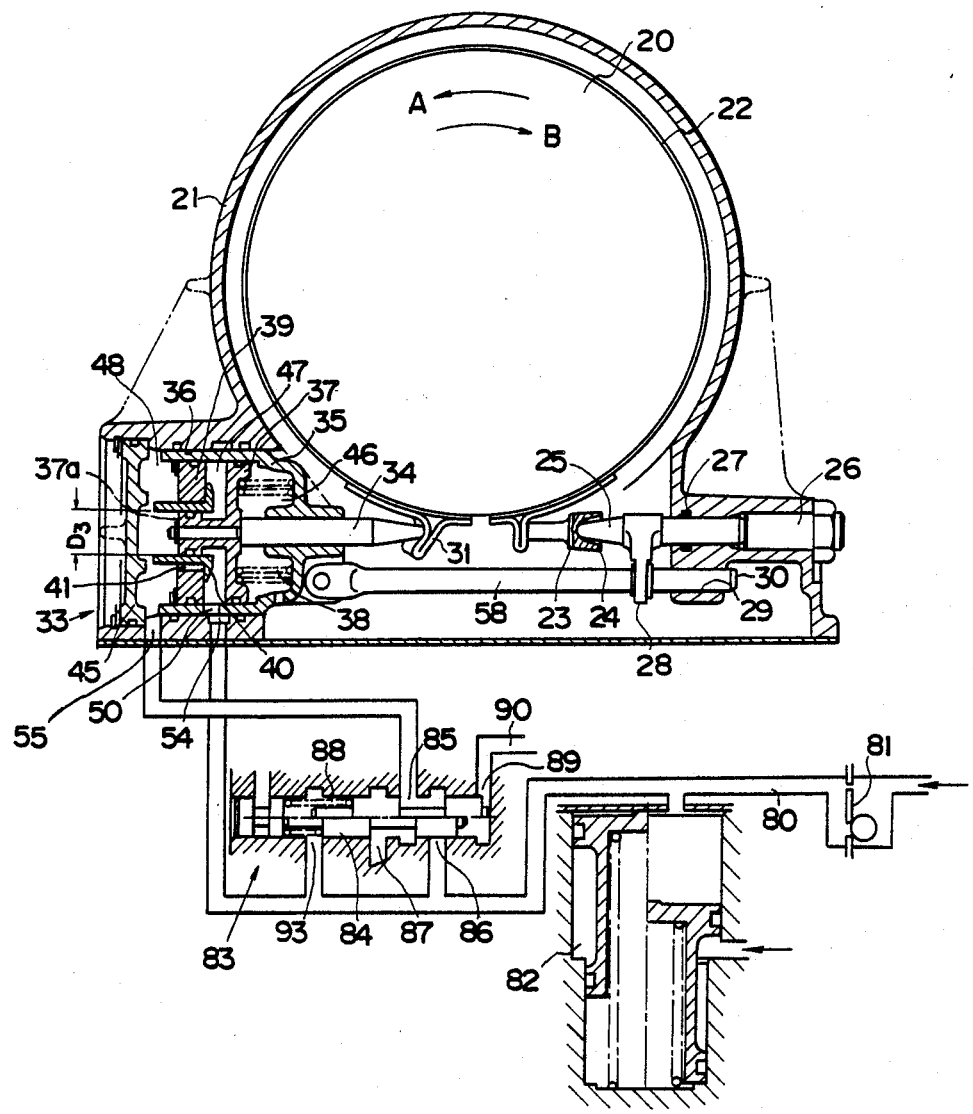
FIG. 15 is a section showing an eighth embodiment of the present invention.
Figure 16:
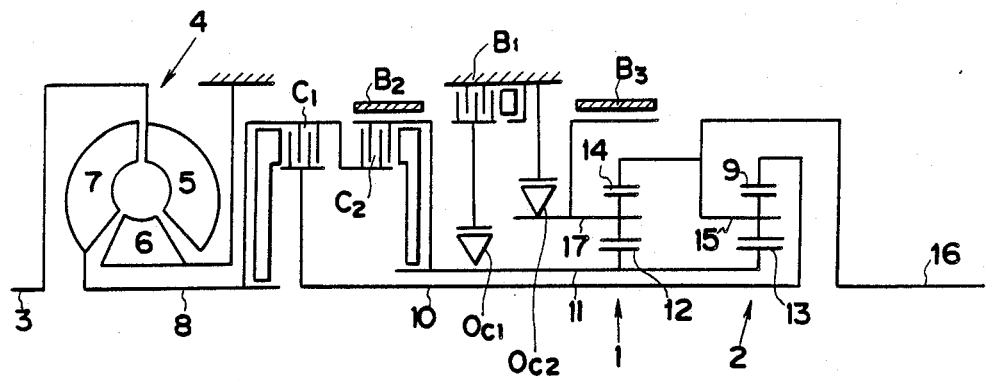
FIG. 16 is a skelton showing the structure of one example of the automatic transmission.

Incidentally, the shift shocks are so reduced by the present invention that they may not be bodily sensed even if the output shaft torque has some fluctuating range. This means that the output shaft torque need not always be linear, as illustrated in FIG. 13. In other words, the abrupt increases of the brake torque and the output shaft torque have small ranges if the range of the abrupt increase of the braking force is small, so that they may not be bodily sensed as the shift shocks. Thus, the abrupt increase in the braking force in that range can be allowed. FIG. 15 is a section showing a further embodiment of the present invention constructed according to this concept. In the embodiment shown in FIG. 15, the stem 37a of the piston 37 is made to have a small diameter so that the pressure receiving areas of the piston 37 may not highly vary between the cases in which the oil pressure is applied to the first oil chamber 47 and in case the oil pressures are applied to both the first and second oil chambers 47 and 48. In the brake system shown in FIG. 15, the diameter $D_3$ of the stem 37a is made far smaller than the diameter $D_2$ of the piston 37, and the stem 37a is so elongated as to extend through the first oil chamber 47 only.

In the structure shown in FIG. 15, therefore, the pressure receiving area of the piston 37 is expressed by the following equation in case the oil pressure is supplied to the first oil chamber 47 only:

$$\pi(D_2^2 - D_3^2)/4.$$

On the contrary, the pressure receiving area of the piston 37 is expressed by the following equation in case the oil pressures are supplied to both the first and second oil chambers 47 and 48:

$$\pi \cdot D_2^2/4.$$

Since, however, the diameter $D_3$ of the stem 37a is set at the aforementioned small value, the substantial pressure receiving areas are not highly difference among the respective cases described above. Considering that the differences among the pressure receiving areas take small values as the fluctuating range of the output shaft torque and that the supply of the oil pressure to the second oil chamber 48 takes immediately before the end of the shift, the temporary increase in the output shaft torque is not so high as will be bodily sensed as the shift shocks.

Even in the structure shown in FIG. 15, the supply of the oil pressure to the second oil chamber 48 will not cause the shift shocks so that its timing is not especially restricted but the control system and method are simplified. Moreover, it is possible to prevent the drop of the durability of the brake band 22.

According to the brake system for an automatic transmission according to the present invention, as is now apparent from the description thus far made, the cylinder tube is moved by the force coming from a rotatable member such as the brake drum connected to the sun gear of the planetary gear mechanism thereby to actuate the valve mechanism so that the fluid pressure is released from fastening the brake band. The brakeage can be automatically released in dependence upon the direction of the torque of the rotatable member so that the brake system can operate like the one-way clutch. Thus, the speed change can be smoothly accomplished even if the one-way clutch and the accompanying brake used in the existing automatic transmission are omitted. As a result, the automatic transmission can have its structure simplified, its weight lightened and its cost dropped.

Moreover, the brake system according to the present invention can accomplish the timing control by itself so that it can omit the timing control valve such as the upshift or downshift timing valve used in the prior art. As a result, the brake system can enjoy an effect that the hydraulic control circuit can have its structure simplified.

In the brake system according to the present invention, still moreover, in case the second oil chamber is communicating with the second oil chamber, the oil pressure to be supplied to the first oil chamber is boosted to a level substantially equal to that of the shift signal pressure so that the change-over valve can be actuated to cause the second oil chamber to communicate with the line pressure oil passage. The increase in the braking force through the brake band by supplying the line pressure to the second oil chamber is timed after the end of the shift so that the shift shocks can be prevented in advance from being adversely affected by the abrupt increase in the braking force.

What is claimed is:

1. A brake system for use with an automatic transmission for braking a rotatable member accommodated in a casing, by bringing a brake band having two ends into contact with an outer circumference of said rotatable member, comprising:
   a cylinder tube so held in a predetermined position in said casing as to move forward and backward in a tangential direction of said rotatable member;
   a piston fitted in said cylinder tube;
   a piston rod united with said piston and projecting from said cylinder tube such that it is connected to one end of said brake band;
   an anchor rod so held in a predetermined position in said casing as to move forward and backward in the tangential direction of said rotatable member and connected to the other end of said brake band;
   a connecting member for connecting said cylinder tube and said anchor rod so that they may move together forward and backward; and
   a valve mechanism disposed in said cylinder tube and adapted to be opened, when said cylinder tube is moved by a force received in a predetermined direction from said brake band through said piston rod to either apply a fluid pressure in a direction to reduce a fastening force by said brake band or release said fluid pressure.

2. A brake system according to claim 1, wherein said rotatable member is a brake drum connected to a sun gear of a planetary gear mechanism provided in the automatic transmission.

3. A brake system according to claim 1, further comprising:
   a chamber formed in said casing for accommodating said cylinder tube while allowing said cylinder tube to move liquid-tight forward and backward;
   a stopper plate closing an end of said cylinder tube, which is opposite to the projection of said piston rod;
   a first chamber formed between said piston and said stopper plate;
   a first passage formed through said casing for supplying and releasing a fluid pressure to and from said first chamber; and
   a return spring for urging said piston toward said stopper plate,
   wherein said valve mechanism is constructed to cause said first chamber to communicate with said chamber which is formed in said casing at the opposite side across said stopper plate when said cylinder tube is moved in a direction opposite to the projecting direction of said piston rod.

4. A brake system according to claim 3, wherein said valve mechanism includes: a valve member extending movably forward and backward through said stopper plate and having its ends projecting to two sides thereof; a further passage formed in such a portion of said stopper plate as is extended by said valve member therethrough, in an extending direction of said valve member; a projection formed at an end portion of said valve member at the side of said first chamber and adapted to contact with a front face of said stopper plate for closing said further passage; and a stationary portion arranged outside of said cylinder tube and in a position to face said stopper plate and adapted to be abutted thereagainst by the end of said valve member, and
   wherein, when said cylinder tube moves in a direction opposite to the projecting direction of said piston rod, the end of said valve member comes into said stationary portion so that said projection comes apart from the front face of said stopper plate to open said further passage.

5. A brake system according to claim 4, wherein said valve member is a cylindrical member formed with said projection at its end at the side of said first chamber.

6. A brake system according to claim 3, wherein said cylinder tube is formed with a further passage for opening said first passage to provide the communication between said first passage and said first chamber, when said cylinder tube moves apart from said end plate, and for coming out of communication with said first passage when said cylinder tube moves to said end plate.

7. A brake system according to claim 1, further comprising:
   a chamber formed in said casing for accommodating said cylinder tube while allowing said cylinder tube to move liquid-tight forward and backward;
   a stopper plate closing an end of said cylinder tube, which is opposite to the projection of said piston rod;
   an end plate so arranged to face said stopper plate as to shut off said chamber from the outside of said casing;
   a first chamber formed between said piston and said stopper plate;
   a second chamber formed between said stopper plate and said end plate;
   a first passage formed through said casing for supplying and releasing a fluid pressure to and from said first chamber;

a second passage formed through said casing for supplying and releasing said fluid pressure to and from said second chamber; and a return spring for urging said piston toward said stopper plate;

wherein said valve mechanism is constructed to cause said first chamber and said second chamber to communicate with each other when said cylinder tube is moved toward said end plate.

8. A brake system according to claim 7, wherein said valve mechanism includes: a valve member extending movably forward and backward through said stopper plate and having its two side ends projecting into said first chamber and said second chamber; a third passage formed in such a portion of said stopper plate as is extended by said valve member therethrough for providing the communication between said first chamber and said second chamber; and a projection formed at an end portion of said valve member at the side of said first chamber and adapted to contact with a front face of said stopper plate for closing said third passage, and wherein, when said cylinder tube moves to said end plate to bring the end of said valve member at the side of said second chamber into abutment against said end plate, said projection comes apart from said stopper plate to open said third passage.

9. A brake system according to claim 8, wherein said valve member is a cylindrical member formed with said projection at its end at the side of said first chamber.

10. A brake system according to claim 9, wherein said piston has a column portion extending liquid-tight through an inner circumference of said valve member and facing said second chamber such that a pressure receiving area of said piston for receiving a fluid pressure supplied to said first chamber is substantially equal to that of said stopper plate.

11. A brake system according to claim 10, wherein the pushing force to be received by said stopper plate through the fluid pressure supplied to said first chamber is set up at a higher level than the pushing force to be received by said cylinder tube through the fluid pressure supplied to said second chamber.

12. A brake system according to claim 10, wherein a diameter of said column portion is far smaller than that of said piston.

13. A brake system according to claim 7, further comprising: a fluid pressure supply passage communicating with said first chamber for establishing said fluid pressure when at least one of gear ratios is to be set; a release passage; and a change-over valve for causing said fluid supply passage and said release passage.

14. A brake system according to claim 13, wherein said gear ratio is at a forward second speed.

15. A brake system according to claim 13, wherein said change-over valve includes: a first port communicating with said second chamber; a second port communicating with said fluid pressure supply passage; a drain port; a spool for causing said first port to communicate selectively with said second port and said drain port; a spring for pushing said spool in an axial direction thereof; and a control pressure port for selectively providing pressure to said spool opposing the pushing direction of said spring.

16. A brake system according to claim 15, further comprising: a control pressure passage communicating with said control pressure port; and an electromagnetic valve disposed midway of said control pressure passage for opening and closing an opening through which said control pressure passage is to be evacuated.

17. A brake system according to claim 16, wherein said electromagnetic valve opens said opening when energized.

18. A brake system according to claim 16, further comprising an orifice formed in said control pressure passage at a predetermined portion opposite to said control pressure port with respect to the portion connected to said electromagnetic valve.

19. A brake system according to claim 16, wherein said fluid pressure supply passage and said control pressure passage are to be supplied with said fluid pressure when at least one of the forward second and fourth speeds is to be set.

20. A brake system according to claim 13, further comprising an accumulator and an orifice disposed midway of said fluid pressure supply passage.

21. A brake system according to claim 13, wherein said change-over valve includes: a first port communicating with said second chamber; a second port communicating with said fluid pressure supply passage; a drain port; a spool for causing said first port to communicate selectively with said second port and said drain port; a spring disposed at one end of said spool for pushing said spool in an axial direction thereof; a first control pressure port opened in the other end of said spool; and a second control pressure port opened in the portion, in which said spring is arranged, for communicating with said fluid pressure supply passage.

22. A brake system according to claim 21, further comprising: a control pressure passage communicating with said first control pressure port; and an electromagnetic valve disposed midway of said control pressure passage for opening and closing an opening through which said control pressure passage is to be evacuated.

23. A brake system according to claim 22, wherein said electromagnetic valve opens said opening when energized.

24. A brake system according to claim 22, further comprising: an orifice formed in said control pressure passage at a predetermined portion opposite to said first control pressure port with respect to the portion connected to said electromagnetic valve; and another control pressure passage branched from between said orifice and said electromagnetic valve, and wherein said electromagnetic valve is a shift control valve adapted to be actuated for setting a predetermined gear ratio to establish the fluid pressure in each of said control pressure passages.

25. A brake system according to claim 21, further comprising an accumulator and an orifice disposed midway of said fluid pressure supply passage.

26. A brake system according to claim 21, further comprising: a second fluid pressure supply passage for supplying the fluid pressure to clutch means in said automatic transmission for setting a predetermined gear ratio; and a control pressure passage for causing said first control pressure port to communicate with said second fluid pressure supply passage.

27. A brake system according to claim 21, wherein the pressure receiving areas of said spool for receiving the fluid pressures supplied from said first control pressure port and said second control pressure port, respectively, are set at the area for causing said first port to communicate with said second port by moving said spool to said first control pressure port if the fluid pressures supplied from said first control pressure port and said second control pressure port are substantially equal to each other.

28. A brake system according to claim 21, wherein a pressure receiving area of said spool for receiving the fluid pressure supplied from said first control pressure port is larger than that for receiving the fluid pressure supplied from said second control pressure port.

29. A brake system according to claim 7 wherein said piston has a column portion extending movably forward and backward while maintaining a liquid-tight seal between said stopper plate and said end plate.

* * * * *